United States Patent
Matsumoto et al.

(10) Patent No.: US 12,280,955 B2
(45) Date of Patent: Apr. 22, 2025

(54) AUTOMATED WAREHOUSE UNIT, AUTOMATED WAREHOUSE EQUIPMENT AND TRANSFER UNIT

(71) Applicant: HIRATA CORPORATION, Kumamoto (JP)

(72) Inventors: Bungo Matsumoto, Kumamoto (JP); Yuichi Iwata, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 399 days.

(21) Appl. No.: 17/875,772

(22) Filed: Jul. 28, 2022

(65) Prior Publication Data

US 2022/0363480 A1 Nov. 17, 2022

Related U.S. Application Data

(63) Continuation of application No. PCT/JP2020/004153, filed on Feb. 4, 2020.

(51) Int. Cl.
*B65G 1/137* (2006.01)
*B65G 1/04* (2006.01)
(Continued)

(52) U.S. Cl.
CPC ......... *B65G 1/1376* (2013.01); *B65G 1/0485* (2013.01); *B65G 1/06* (2013.01);
(Continued)

(58) Field of Classification Search
CPC ...... B65G 1/1376; B65G 1/0485; B65G 1/06; B65G 47/5186; B65G 47/643
See application file for complete search history.

(56) References Cited

U.S. PATENT DOCUMENTS

| 4,972,936 A | 11/1990 | Kura |
| 6,276,513 B1 | 8/2001 | Asano et al. |

(Continued)

FOREIGN PATENT DOCUMENTS

| CA | 1111353 A | 10/1981 |
| CN | 102807097 A | 12/2012 |

(Continued)

OTHER PUBLICATIONS

International Preliminary Report on Patentability (PCT/IPEA/409) issued in corresponding International Patent Application No. PCT/JP2020/004153 dated Jan. 4, 2022. (19 pages).

(Continued)

*Primary Examiner* — James R Bidwell
(74) *Attorney, Agent, or Firm* — Buchanan Ingersoll & Rooney PC

(57) ABSTRACT

An automated warehouse unit includes two rows of fixed conveyors conveying the storage target object in a first direction, a receiving-side transfer unit provided on one end portion side of the two rows and extending in a second direction, and a shipping-side transfer unit provided on the other end portion side of the two rows and extending in the second direction. Each transfer unit includes a moving device configured to reciprocally move a moving body in the second direction between a position facing one fixed conveyor in the fixed conveyors and a position facing the other fixed conveyor in the fixed conveyors, and a transportation conveyor supported by the moving body and configured to transfer the storage target object to the two rows in the first direction.

12 Claims, 13 Drawing Sheets

(51) Int. Cl.
  *B65G 1/06* (2006.01)
  *B65G 47/51* (2006.01)
  *B65G 47/64* (2006.01)
(52) U.S. Cl.
  CPC ....... *B65G 47/5186* (2013.01); *B65G 47/643* (2013.01); *B65G 2205/00* (2013.01)

(56) References Cited

U.S. PATENT DOCUMENTS

| | | | |
|---|---|---|---|
| 6,398,482 | B2 | 6/2002 | Asano et al. |
| 8,459,442 | B2 | 6/2013 | Morimoto et al. |
| 10,106,336 | B2 | 10/2018 | Hirasawa et al. |
| 11,091,329 | B2 | 8/2021 | Hawighorst et al. |
| 2002/0008001 | A1 | 1/2002 | Asano et al. |
| 2012/0305364 | A1 | 12/2012 | Morimoto et al. |
| 2015/0291371 | A1 | 10/2015 | Hirasawa et al. |
| 2020/0048018 | A1 | 2/2020 | Hawighorst et al. |
| 2021/0009348 | A1* | 1/2021 | Pietrowicz ........... B65G 1/0478 |
| 2023/0415994 | A1* | 12/2023 | Ueda ..................... B65G 1/065 |

FOREIGN PATENT DOCUMENTS

| | | |
|---|---|---|
| CN | 104773432 A | 7/2015 |
| CN | 104871103 A | 8/2015 |
| CN | 106379682 A | 2/2017 |
| CN | 106516535 A | 3/2017 |
| CN | 206427592 U | 8/2017 |
| CN | 107685792 A | 2/2018 |
| CN | 109313731 A | 2/2019 |
| CN | 109335521 A | 2/2019 |
| CN | 110300721 A | 10/2019 |
| JP | H02137308 U | 11/1990 |
| JP | H03200603 A | 9/1991 |
| JP | H04260513 A | 9/1992 |
| JP | H04371404 A | 12/1992 |
| JP | H05124721 A | 5/1993 |
| JP | H07267306 A | 10/1995 |
| JP | H1045235 A | 2/1998 |
| JP | H10279023 A | 10/1998 |
| JP | H10291610 A | 11/1998 |
| JP | H1110261 A | 1/1999 |
| JP | H1159817 A | 3/1999 |
| JP | 2000025953 A | 1/2000 |
| JP | 3483048 B2 | 1/2004 |
| JP | 2008013300 A | 1/2008 |
| WO | WO-2011146956 A2 * 12/2011 ........... B65G 1/0485 |

OTHER PUBLICATIONS

International Search Report (PCT/ISA/210) with translation and Written Opinion (PCT/ISA/237) mailed on Apr. 21, 2020, by the Japanese Patent Office as the International Searching Authority for International Application No. PCT/JP2020/004153. (10 pages).

Office Action (Notice of Reasons for Refusal) issued on Aug. 25, 2023, in corresponding Japanese Patent Application No. 2021-575131 and English translation of the Office Action. (10 pages).

Chen et al., "Research on the Efficiency of the External Transportation System of the Material Storage and Transportation System", China Academic Journal Electronic Publishing House, Sep. 30, 2016. (7 pages).

Office Action issued on May 30, 2023, in corresponding Chinese Patent Application No. 202080094742.9 and English translation of the Office Action. (27 pages).

Office Action issued on May 17, 2024, in corresponding Chinese Patent Application No. 202080094742.9. (5 pages).

Sun Hong-ying, "The Application of Barcode Technology in Logistics and Warehouse Management1", May 31, 2009, First International Workshop on Education Technology and Computer Science, pp. 732-735.

Office Action issued on Jul. 25, 2022, in corresponding Taiwanese Patent Application No. 110102757 and English translation of the Office Action. (18 pages).

* cited by examiner

AUTOMATED WAREHOUSE UNIT, AUTOMATED WAREHOUSE EQUIPMENT AND TRANSFER UNIT

CROSS-REFERENCE TO RELATED APPLICATION(S)

This application is a Continuation of International Patent Application No. PCT/JP2020/004153, filed Feb. 4, 2020, the entire disclosures of which are incorporated herein by reference.

BACKGROUND OF THE INVENTION

Field of the Invention

The present invention relates to an automated warehouse.

Description of the Related Art

There is disclosed a technique for constructing an automated warehouse equipment that loads and stores a storage target object and unloads a storage target object using a conveyor (Japanese Patent No. 3483048).

In an automated warehouse equipment using a conveyor, a loading order of loading storage target objects into the automated warehouse equipment may be different from an unloading order of unloading storage target objects from the automated warehouse equipment. This is so-called "LIFO" or "FILO". In this case, in the automated warehouse equipment described in PTL 1, to unload an arbitrary storage target object loaded into a storage conveyor of a given row, it is necessary to unload all storage target objects loaded into the storage conveyor of the same row before the arbitrary storage target object is loaded. In other words, before unloading a desired storage target object, it is necessary to unload undesired storage target objects once, and thus the efficiency of the loading/unloading work is low in terms of a work process and work time.

SUMMARY OF THE INVENTION

The present invention provides an automated warehouse equipment capable of efficiently loading/unloading only a desired storage target object.

According to an aspect of the present invention, there is provided an automated warehouse unit comprising: two rows of fixed conveyors, on which a storage target object is placed, configured to convey the storage target object in a first direction; a receiving-side transfer unit provided on one end portion side of the two rows of the fixed conveyors and extending in a second direction orthogonal to the first direction; and a shipping-side transfer unit provided on the other end portion side of the two rows of the fixed conveyors and extending in the second direction, wherein each of the receiving-side transfer unit and the shipping-side transfer unit includes a first moving device configured to reciprocally move a first moving body in the second direction between a position facing one fixed conveyor in the two rows of the fixed conveyors and a position facing the other fixed conveyor in the two rows of the fixed conveyors, and a first transportation conveyor supported by the first moving body and configured to transfer the storage target object to the two rows of the fixed conveyors in the first direction, each of the two rows of the fixed conveyors includes a plurality of first stopping device which are arranged along the first direction and are configured to contact the storage target object so as to stop conveying of the storage target object, and each of the plurality of first stopping device defines a storage position for one storage target object.

Further features of the present invention will become apparent from the following description of exemplary embodiments (with reference to the attached drawings).

DESCRIPTION OF THE EMBODIMENTS

Figure 1:
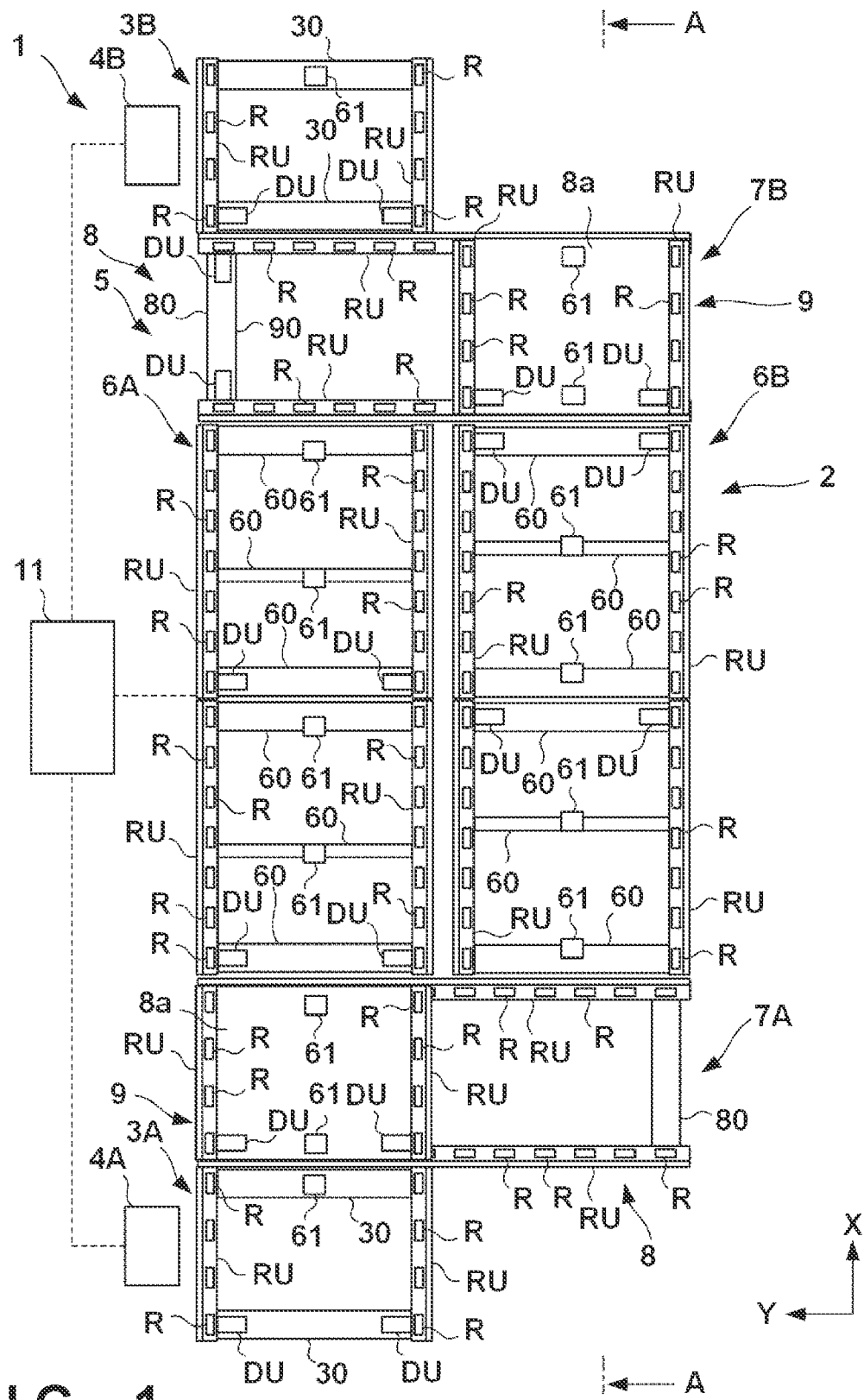
FIG. 1 is a plan view of an automated warehouse equipment according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

<Automated Warehouse Equipment>

Figure 2:
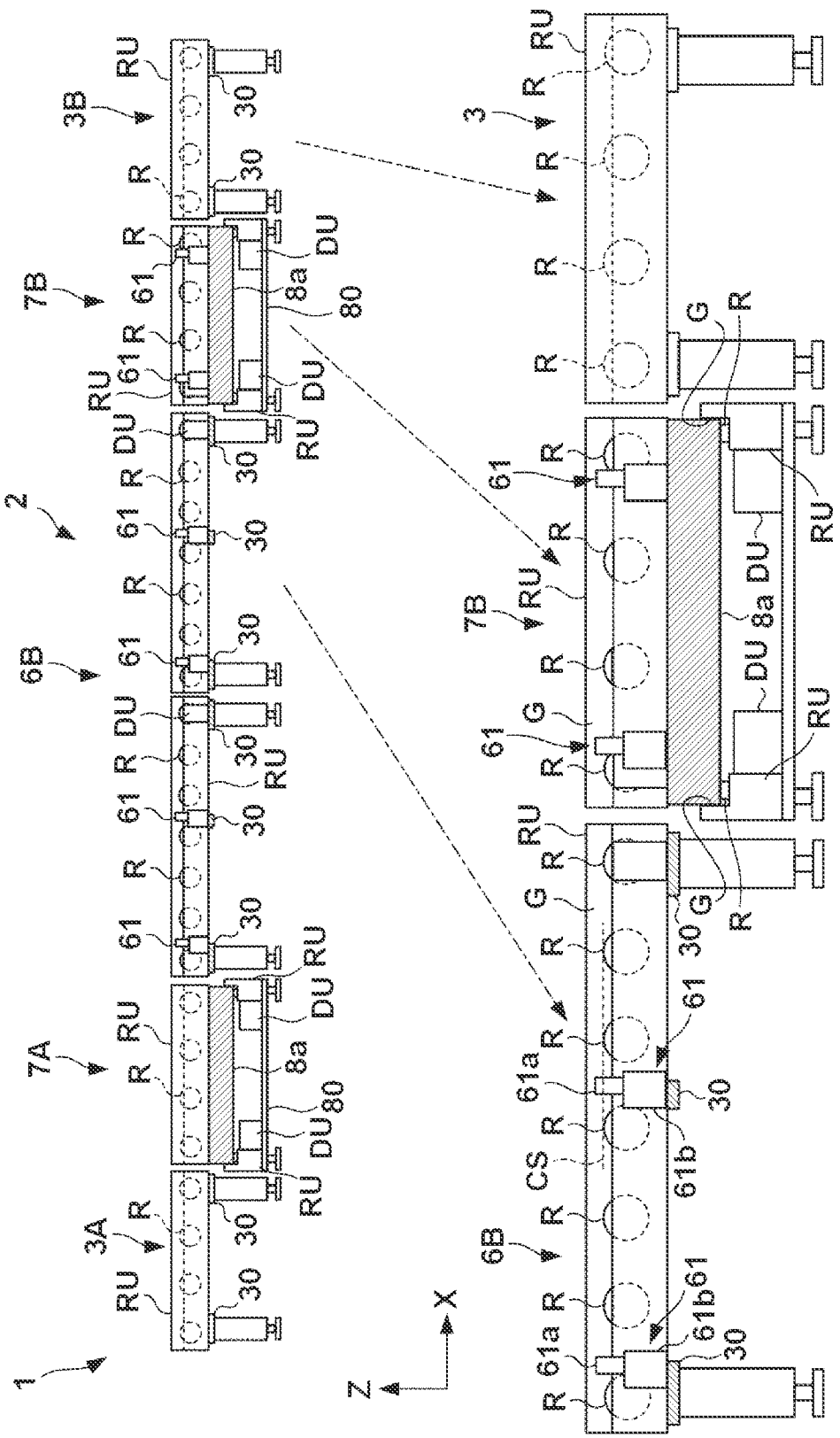
FIG. 2 shows a view of a section taken along a line A-A in FIG. 1 and a partially enlarged view.

FIG. 1 is a plan view of an automated warehouse equipment 1 according to the embodiment of the present invention. FIG. 2 shows a view of a section taken along a line A-A in FIG. 1 and a partially enlarged view. In the drawings, arrows X and Y represent horizontal directions orthogonal to each other, and an arrow Z represents a vertical direction with respect to the X-Y plane. The automated warehouse equipment 1 includes an automated warehouse unit 2, a loading device 3A, an unloading device 3B, a receiving registration device 4A, a shipping registration device 4B, and a control device 11. A storage target object is stored in the automated warehouse unit 2. The loading device 3A is a device that loads a storage target object into the automated warehouse unit 2, and the unloading device 3B is a device that unloads a storage target object from the automated warehouse unit 2. The operation of the automated warehouse equipment 1 is controlled by the control device 11.

The control device 11 includes, for example, a processor represented by a CPU, a storage device such as a RAM, a ROM, or a hard disk, and an input/output interface for relaying an external device and the processor. The receiving registration device 4A and the shipping registration device 4B are communicably connected to the control device 11. The receiving registration device 4A is a device that registers a storage target object when loading the storage target object from the loading device 3A into the automated warehouse unit 2 and storing it, and the shipping registration device 4B is a device that registers a storage target object stored in the automated warehouse unit 2 when unloading the storage target object to the unloading device 3B and canceling the storage of the storage target object.

Each of the receiving registration device 4A and the shipping registration device 4B is, for example, a device that inputs identification information unique to a storage target object. The identification information is stored in, for example, an IC tag such as RFID and added to the storage target object. In this case, each of the receiving registration device 4A and the shipping registration device 4B includes a reading device that reads the identification information from the IC tag in a contactless manner, and transmits the read identification information to the control device 11. The control device 11 stores, in a database, the identification information received from the receiving registration device 4A and the storage position of the storage target object in association with each other, and manages them. The database is created in the control device 11 or in an external storage device. The control device 11 updates the database by setting, as a shipped storage target object, the storage target object corresponding to the identification information received from the shipping registration device 4B. This can perform receiving/shipping management of a storage target object stored in the automated warehouse unit 2.

The identification information may be directly printed as a barcode or a two-dimensional code on the storage target object or printed on a sticker and attached to the storage target object, instead of being stored in the IC tag and added to the storage target object. In this case, each of the receiving registration device 4A and the shipping registration device 4B includes a reader that reads such code. Alternatively, the identification information may be represented by a characters or symbols on the storage target object. In this case, each of the receiving registration device 4A and the shipping registration device 4B may include an input device that allows an operator to input such characters or symbols. The storage target object is preferably mounted on a pallet or tray and stored. In this case, the identification information unique to the storage target object is stored in an identification information medium on the pallet or tray side. The identification information medium indicates the IC tag, barcode, or two-dimensional code.

<Automated Warehouse Unit>

The automated warehouse unit 2 includes two rows of fixed conveyors 6A and 6B arranged on the left and right sides on a horizontal surface (arranged in the Y direction in FIG. 1), a receiving-side transfer unit 7A, and a shipping-side transfer unit 7B. Each of the fixed conveyors 6A and 6B is a conveyor that is formed by one or more conveyor units, extends in the X direction, is installed by being fixed to the floor surface, and can convey a storage target object in the X direction. Each of the fixed conveyors 6A and 6B has a function capable of conveying a storage target object in both directions in the X direction. In this embodiment, however, the control operation of the fixed conveyors 6A and 6B is performed so that the conveyance directions of a storage target object are opposite to each other. The fixed conveyor 6A conveys a storage target object from the side of the transfer unit 7A to the side of the transfer unit 7B, and the fixed conveyor 6B conveys a storage target object from the side of the transfer unit 7B to the side of the transfer unit 7A. Alternatively, the fixed conveyor 6A conveys a storage target object from the side of the transfer unit 7B to the side of the transfer unit 7A, and the fixed conveyor 6B conveys a storage target object from the side of the transfer unit 7A to the side of the transfer unit 7B.

The fixed conveyors 6A and 6B basically have the same structure, and will be referred to as a fixed conveyor 6 hereinafter when they need not particularly be discriminated. The fixed conveyor 6 is a roller conveyor in this embodiment but may be another kind of conveyor such as a belt conveyor.

In this embodiment, the fixed conveyor 6 is formed by sequentially arranging, in the X direction, sets each including two roller units RU separated in the Y direction. The rows of the two roller units RU separated in the Y direction are arrayed to be parallel to each other by being connected by a plurality of frames 60 extended in the Y direction. Each roller unit RU includes a driving unit DU, a roller array obtained by arraying a plurality of conveyance rollers R in the X direction, and a transmission mechanism for transmitting the driving force of the driving unit DU to each conveyance roller R. The driving unit DU includes, for example, a driving source such as a motor and a speed reducer that reduces the output of the driving source. The driving force of the driving unit DU is transmitted to each conveyance roller R by the transmission mechanism, and each conveyance roller R rotates about a rotation axis in the Y direction. The transmission mechanism is, for example, a gear device, a chain transmission mechanism, or a belt transmission mechanism. Each roller unit RU includes a guide wall G with a vertical guide surface. The guide wall G suppresses the rattling in the Y direction of a storage target object moving on the conveyance rollers R, and guides conveyance.

The fixed conveyor 6 includes a plurality of stopping devices 61 each of which defines the storage position of a storage target object. Each stopping device 61 is supported by the frame 60. Each stopping device 61 includes a contact portion 61a, and an actuator (electric actuator 61b) that moves the contact portion 61a in the Z direction between the raised position and the lowered position. FIG. 2 shows a state in which the contact portion 61a is located at the raised position. At the raised position, part of the contact portion 61a is located at a position higher than a conveyance surface CS defined by the conveyance rollers R. This causes a storage target object conveyed by the conveyance rollers R to contact the contact portion 61a and stop. At the lowered position, the contact portion 61a is located at a position lower than the conveyance surface CS. This causes the storage target object conveyed by the conveyance rollers R to pass above the stopping device 61 without contacting the contact portion 61a. The electric actuator 61b is, for example, an electromagnetic solenoid or an electric cylinder. In this embodiment, the electric actuator 61b is preferable as an actuator but a common air cylinder may be used as a stopping device, as a matter of course.

The control device 11 drives the stopping device 61 to convey the storage target object or make the storage target object stop at the storage position. For example, when storing the storage target object at a predetermined storage position, the control device 11 raises the contact portion 61a of the stopping device 61 corresponding to the storage position to the raised position. When the storage target object conveyed by the fixed conveyor 6 reaches the predetermined storage position, the storage target object contacts the contact portion 61a to stop. At this time, it is preferable to prevent transmission of the conveyance force to the storage target object by making the conveyance rollers R idle with respect to the storage target object while continuously rotating the conveyance rollers R. When conveying the stopped storage target object again, the contact portion 61a is lowered to the lowered position.

Note that a method other than the method using the stopping device 61 can be adopted to control the storage position of the storage target object. For example, a sensor that detects arrival of a storage target object may be provided at each storage position, and conveyance of the storage target object may be controlled based on the detection result of the sensor to stop the storage target object at the storage position.

The transfer units 7A and 7B will be described next. The transfer unit 7A is provided on one end portion side (the side of the loading device 3A) in the extending direction (the X direction in FIG. 1) of the two rows of the fixed conveyors 6A and 6B, and the transfer unit 7B is provided on the other end portion side (the side of the unloading device 3B) in the extending direction of the two rows of the fixed conveyors 6A and 6B. The transfer units 7A and 7B basically have the same structure, and will be referred to as a transfer unit 7 hereinafter when they need not particularly be discriminated.

The transfer unit 7 is extended in the Y direction over the two rows of the fixed conveyors 6A and 6B. The transfer unit 7 includes a moving device 8 that moves a moving body 8a in the Y direction, and a transportation conveyor 9 supported by the moving body 8a. In this embodiment, the moving device 8 is a roller conveyor that reciprocally moves the moving body 8a in the Y direction.

In this embodiment, the moving device 8 is formed by a set of two roller units RU separated in the X direction. Each roller unit RU is extended in the Y direction, and has the same arrangement as that of the roller unit RU described with respect to the fixed conveyor 6 except the number of rollers R. The rows of the two roller units RU separated in the X direction are arrayed to be parallel to each other by being connected by a plurality of frames 80 extended in the X direction. The moving body 8a is a plate-like member placed on the rollers R, and is moved in the Y direction by the rotation of the rollers R.

Note that the moving device 8 may be another kind of conveyor such as a belt conveyor. Alternatively, the moving device 8 may be a mechanism for reciprocally moving the moving body 8a, other than the conveyor, and may be, for example, a ball screw mechanism, a belt transmission mechanism, or a linear motor.

The transportation conveyor 9 is mounted on the moving body 8a, and fixed to the moving body 8a. The transportation conveyor 9 is a roller conveyor in this embodiment but may be another kind of conveyor such as a belt conveyor. In this embodiment, the transportation conveyor 9 is formed by a set of two roller units RU separated in the Y direction.

Each roller unit RU is extended in the X direction, and has the same arrangement as that of the roller unit RU described with respect to the fixed conveyor 6 except for the number of rollers R. The rows of the two roller units RU separated in the Y direction are arrayed to be parallel to each other by being connected by the moving body 8a.

The transportation conveyor 9 can transfer the storage target object in both directions in the X direction. The conveyance surfaces CS of the fixed conveyors 6A and 6B and the transportation conveyor 9 have the same height. The transportation conveyor 9 transfers the storage target object to the fixed conveyors 6A and 6B in the X direction. In this embodiment, the moving device 8 reciprocally moves the transportation conveyor 9 fixed to the moving body 8a between two stop positions by moving the moving body 8a. More specifically, the moving device 8 reciprocally moves the transportation conveyor 9 between a position continued to the fixed conveyor 6A and a position continued to the fixed conveyor 6B. Therefore, the transportation conveyor 9 can be regarded as a moving conveyor or a traverser. The moving body 8a is stopped by, for example, contacting a stopper provided at each stop position in the moving device 8.

The transportation conveyor 9 includes two stopping devices 61 each of which defines the storage position of the storage target object. The stopping devices 61 are separated in the X direction and supported by the moving body 8a. When one stopping device 61 stops the storage target object, the other stopping device 61 restricts movement of the storage target object to the other side. This prevents the storage target object from unintentionally moving toward the loading device 3A (or the unloading device 3B) and dropping from the transportation conveyor 9 when the transportation conveyor 9 reciprocally moves in the Y direction. The transportation conveyor 9 of the receiving-side transfer unit 7A may include the stopping device 61 on the side of the fixed conveyor 6, and include, on the side of the loading device 3A, an anti-back mechanism that prevents movement of the storage target object from the transfer unit 7A to the loading device 3A.

The control device 11 drives each stopping device 61 to convey the storage target object or stop the storage target object at the storage position. For example, when storing the storage target object at a predetermined storage position, the control device 11 raises the contact portion 61a of the stopping device 61 corresponding to the storage position to the raised position. When the storage target object conveyed by the fixed conveyor 6 reaches the predetermined storage position, the storage target object contacts the contact portion 61a to stop conveyance of the storage target object. At this time, it is preferable to prevent transmission of the conveyance force to the storage target object by making the conveyance rollers R idle with respect to the storage target object while continuously rotating the conveyance rollers R. When conveying the stopped storage target object again, the contact portion 61a corresponding to the conveyance direction is lowered to the lowered position.

Note that a method other than the method using the stopping device 61 can be adopted to control the storage position of the storage target object. For example, a sensor that detects arrival of a storage target object may be provided at the predetermined storage position on the transportation conveyor 9, and conveyance of the storage target object may be controlled based on the detection result of the sensor to stop the storage target object at the storage position.

One of the two stop positions of the transportation conveyor 9 is a position at which the roller units RU of the transportation conveyor 9 face the roller units RU of the fixed conveyor 6A, and this stop position will be referred to as a stop position A hereinafter. In the example shown in FIG. 1, the transportation conveyor 9 of the transfer unit 7A stops at the stop position A. At the stop position A, the roller units RU of the loading device 3A and the unloading device 3B, the roller units RU of the transportation conveyor 9, and the roller units RU of the fixed conveyor 6A are aligned (the positions in the Y direction coincide with each other, respectively).

The other one of the two stop positions of the transportation conveyor 9 is a position at which the roller units RU of the transportation conveyor 9 face the roller units RU of the fixed conveyor 6B, and this stop position will be referred to as a stop position B hereinafter. In the example shown in FIG. 1, the transportation conveyor 9 of the transfer unit 7B stops at the stop position B. At the stop position B, the roller units RU of the transportation conveyor 9 and the roller units RU of the fixed conveyor 6B are aligned (the positions in the Y direction coincide with each other, respectively).

In this embodiment, in the control operation, when the transportation conveyor 9 of the transfer unit 7A is located at the stop position A, the storage target object can be transferred between the transportation conveyor 9 and the fixed conveyor 6A. Furthermore, the storage target object can be transferred from the loading device 3A to the transportation conveyor 9. When the transportation conveyor 9 of the transfer unit 7A is located at the stop position B, the storage target object can be transferred between the fixed conveyor 6B and the transportation conveyor 9.

In this embodiment, in the control operation, when the transportation conveyor 9 of the transfer unit 7B is located at the stop position A, the storage target object can be transferred between the fixed conveyor 6A and the transportation conveyor 9. Furthermore, the storage target object can be transferred from the transportation conveyor 9 to the unloading device 3B. When the transportation conveyor 9 of the transfer unit 7B is located at the stop position B, the storage target object can be transferred between the transportation conveyor 9 and the fixed conveyor 6B.

<Loading Device and Unloading Device>

The loading device 3A and the unloading device 3B will be described. The loading device 3A is arranged adjacent to the transfer unit 7A, and transfers (loads) a storage target object to the transfer unit 7A. The unloading device 3B is arranged adjacent to the transfer unit 7B, and receives (unloads) a storage target object from the transfer unit 7B.

In this embodiment, the loading device 3A is formed by a set of two roller units RU separated in the Y direction. Each roller unit RU is extended in the X direction, and has the same arrangement as that of the roller unit RU described with respect to the fixed conveyor 6 except for the number of rollers R. The rows of the two roller units RU separated in the Y direction are arrayed to be parallel to each other by being connected by a plurality of frames 30.

In this embodiment, the unloading device 3B has the same arrangement as that of the loading device 3A, and is formed by a set of two roller units RU separated in the Y direction. Each roller unit RU is extended in the X direction, and has the same arrangement as that of the roller unit RU described with respect to the fixed conveyor 6 except for the number of rollers R. The rows of the two roller units RU separated in the Y direction are arrayed to be parallel to each other by being connected by a plurality of frames 30.

The conveyance surfaces CS of the loading device 3A and the unloading device 3B, the transportation conveyor 9, and the fixed conveyors 6A and 6B have the same height. The loading device 3A is arranged at a position facing the transportation conveyor 9 of the transfer unit 7A located at the stop position A, and the roller units RU of the loading device 3A and the roller units RU of the transportation conveyor 9 at the stop position A are aligned (the positions in the Y direction coincide with each other, respectively). The unloading device 3B is arranged at a position facing the transportation conveyor 9 of the transfer unit 7B located at the stop position A, and the roller units RU of the unloading device 3B and the roller units RU of the transportation conveyor 9 at the stop position A are aligned (the positions in the Y direction coincide with each other, respectively).

The loading device 3A and the unloading device 3B have a function capable of transferring the storage target object in both directions in the X direction. In this embodiment, however, in the control operation, the loading device 3A transfers the storage target object to the transportation conveyor 9 of the transfer unit 7A located at the stop position A. Furthermore, the unloading device 3B receives the storage target object from the transportation conveyor 9 of the transfer unit 7B located at the stop position A.

Note that in this embodiment, the roller conveyors have been exemplified as the loading device 3A and the unloading device 3B but another kind of conveyor such as a belt conveyor may be used. Each of the loading device 3A and the unloading device 3B may be an aerial transporting device such as a suspended train or drone, or an automated guided vehicle.

Operation Example

An example of the operation of the automated warehouse equipment 1 under the control of the control device 11 will be described with reference to FIGS. 3 to 7. In this embodiment, the conveyance paths of the transfer unit 7A, the fixed conveyor 6A, the transfer unit 7B, and the fixed conveyor 6B can form an annular conveyance path on which horizontal circulation conveyance of a storage target object is performed. This makes it possible to efficiently unload only a desired storage target object regardless of the loading order of storage target objects.

Figure 3:
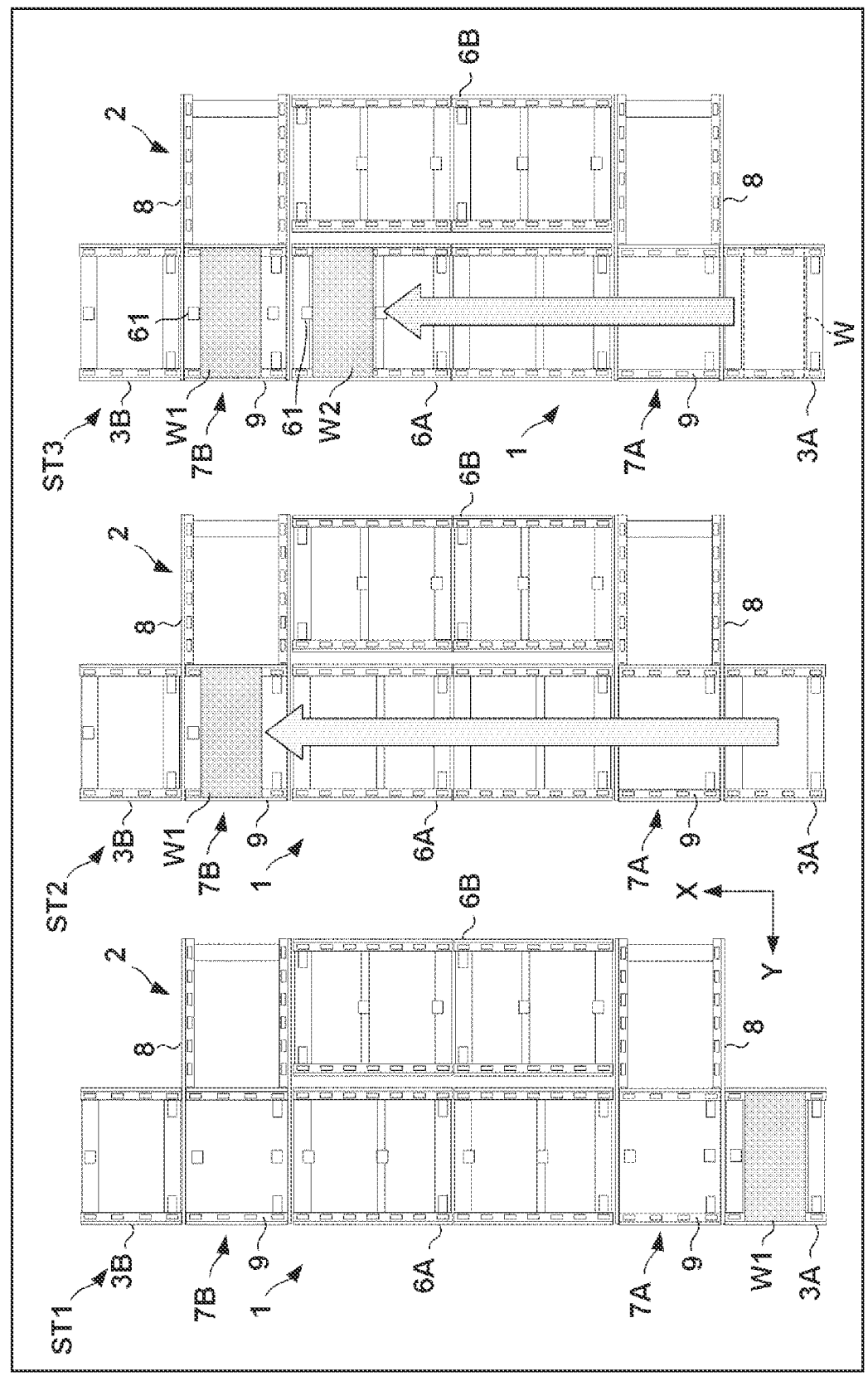
FIG. 3 is an explanatory view of an example of the operation of the automated warehouse equipment shown in FIG. 1.
Figure 4:
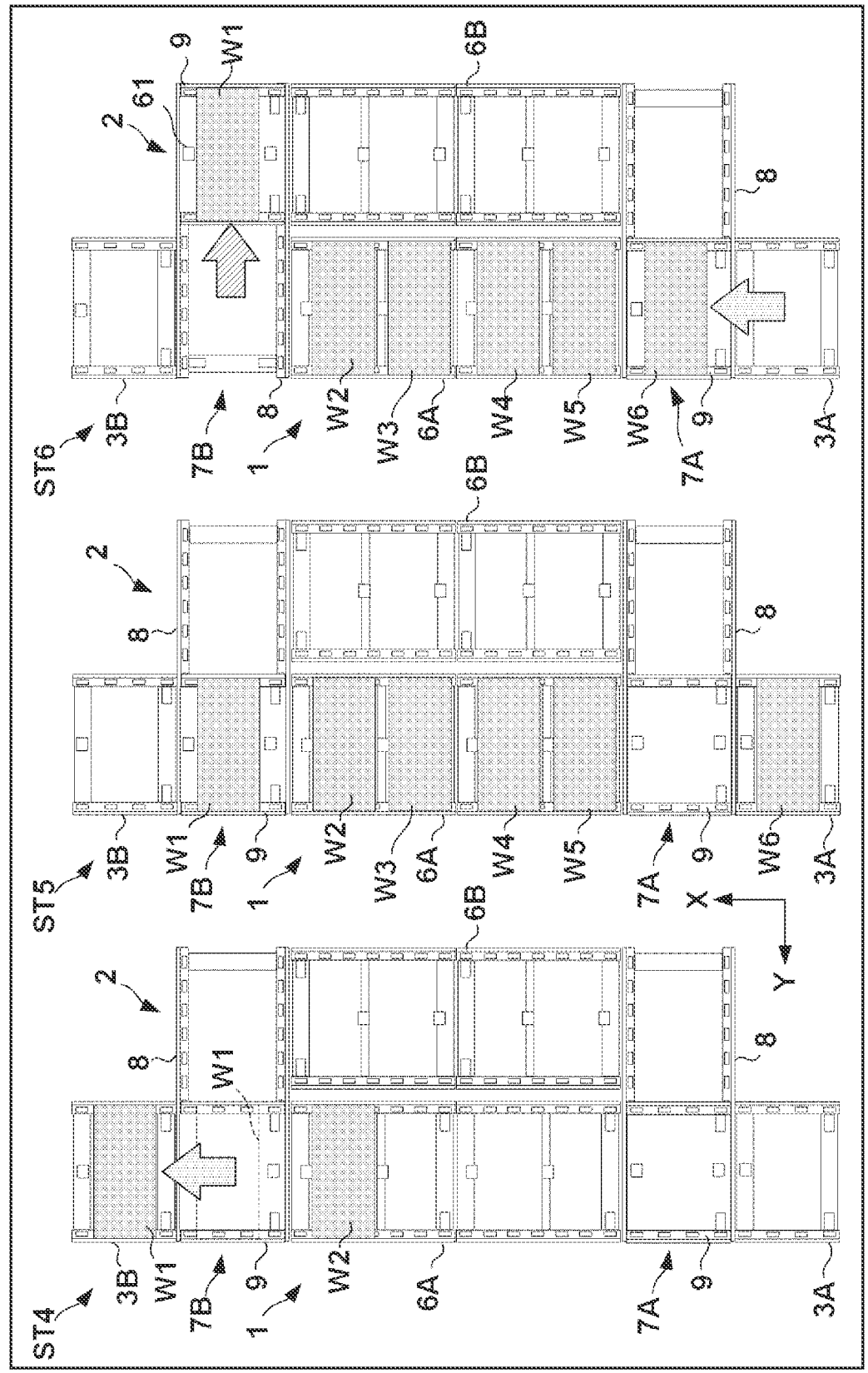
FIG. 4 is an explanatory view of the example of the operation of the automated warehouse equipment shown in FIG. 1.

A state ST1 shown in FIG. 3 indicates a state in which a storage target object W1 is received from the loading device 3A. All of the transportation conveyors 9 of the transfer units 7A and 7B are located at the stop position A. By driving the loading device 3A, the transportation conveyor 9 of the transfer unit 7A, the fixed conveyor 6A, and the transportation conveyor 9 of the transfer unit 7B, the storage target object W1 is transferred and conveyed in an order of the loading device 3A→the transfer unit 7A (stop position A)→fixed conveyor 6A→transfer unit 7B (stop position A), and is transferred onto the transportation conveyor 9 of the transfer unit 7B, as indicated by a state ST2. Then, by driving the stopping device 61 on the front side in the conveyance direction, the contact portion 61a is located at the raised position, and the storage target object W1 is stopped at the position of the stopping device 61 on the front side in the conveyance direction on the transportation conveyor 9 of the transfer unit 7B. The storage target object W1 first sets the position on the transportation conveyor 9 as a storage position.

A state ST3 shown in FIG. 3 indicates a state in which a next storage target object W2 is loaded from the loading device 3A. The storage target object W2 is conveyed on the fixed conveyor 6A to a position adjacent to the storage target object W1, and is stopped at the position by driving of the stopping device 61. The storage target object W2 first sets, as a storage position, the position adjacent to the storage target object W1 on the fixed conveyor 6A.

Assume that in this state, it is necessary to ship the storage target object W1. In this case, as indicated by a state ST4 in FIG. 4, the conveyor 9 of the transfer unit 7B and the unloading device 3B are driven to lower the stopping device 61 provided in the transportation conveyor 9 on the transfer unit 7B, thereby making it possible to transfer the storage target object W1 to the unloading device 3B.

If other storage target objects are sequentially received in the state ST3 shown in FIG. 3, the storage target objects are sequentially conveyed onto the fixed conveyor 6A and stored. If, as indicated by a state ST5 in FIG. 4, the storage target object W2 and storage target objects W3 to W5 are placed on the fixed conveyor 6A and stored, a storage target object cannot be stored on the fixed conveyor 6A anymore. When a next storage target object W6 is received from the loading device 3A, horizontal circulation conveyance starts. As indicated by a state ST6 in FIG. 4, the transportation conveyor 9 of the transfer unit 7B is moved from the stop position A to the stop position B together with the storage target object W1. The storage target object W6 is transferred from the loading device 3A to the transportation conveyor 9 of the transfer unit 7A.

Figure 5:
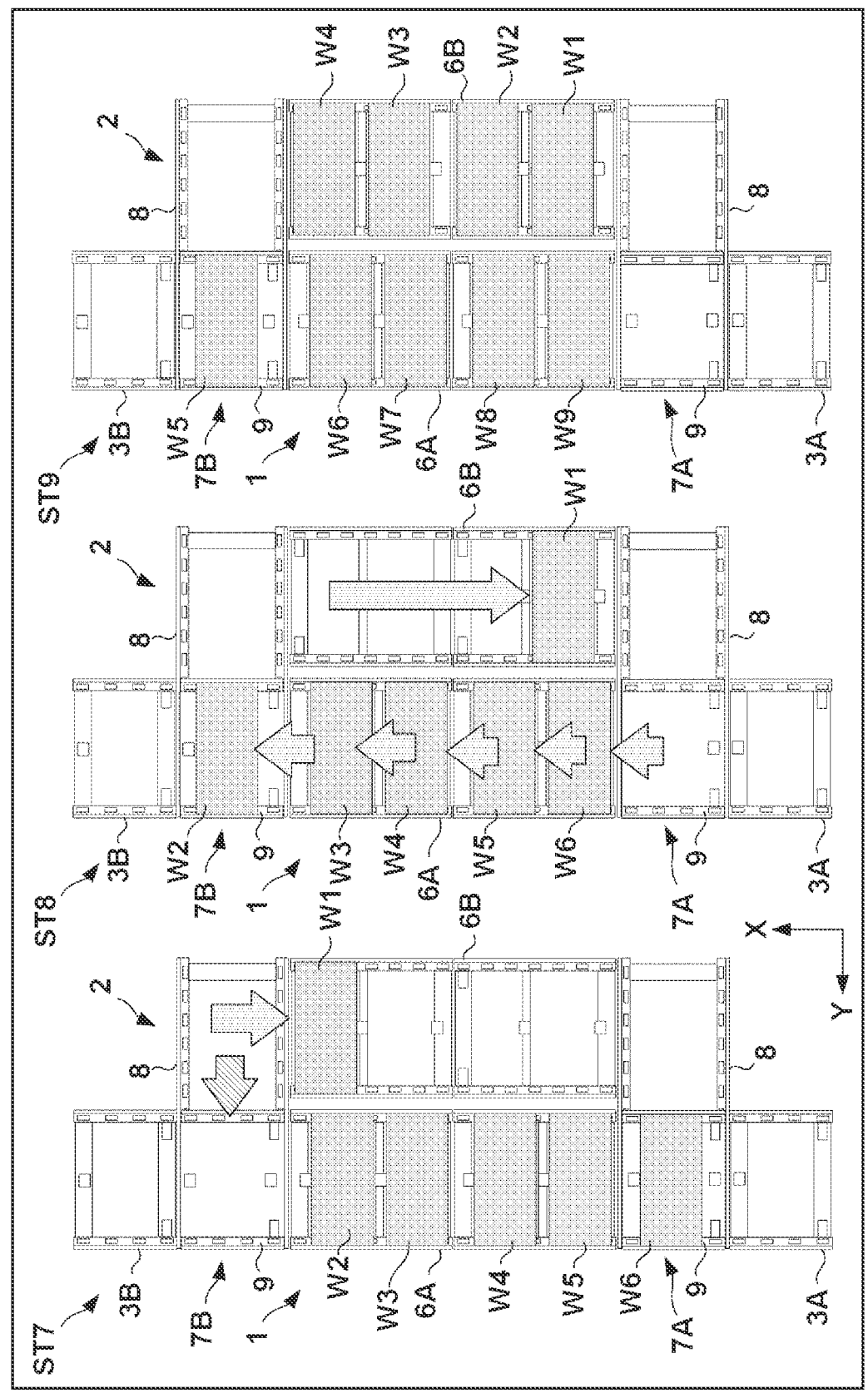
FIG. 5 is an explanatory view of the example of the operation of the automated warehouse equipment shown in FIG. 1.
Figure 6:
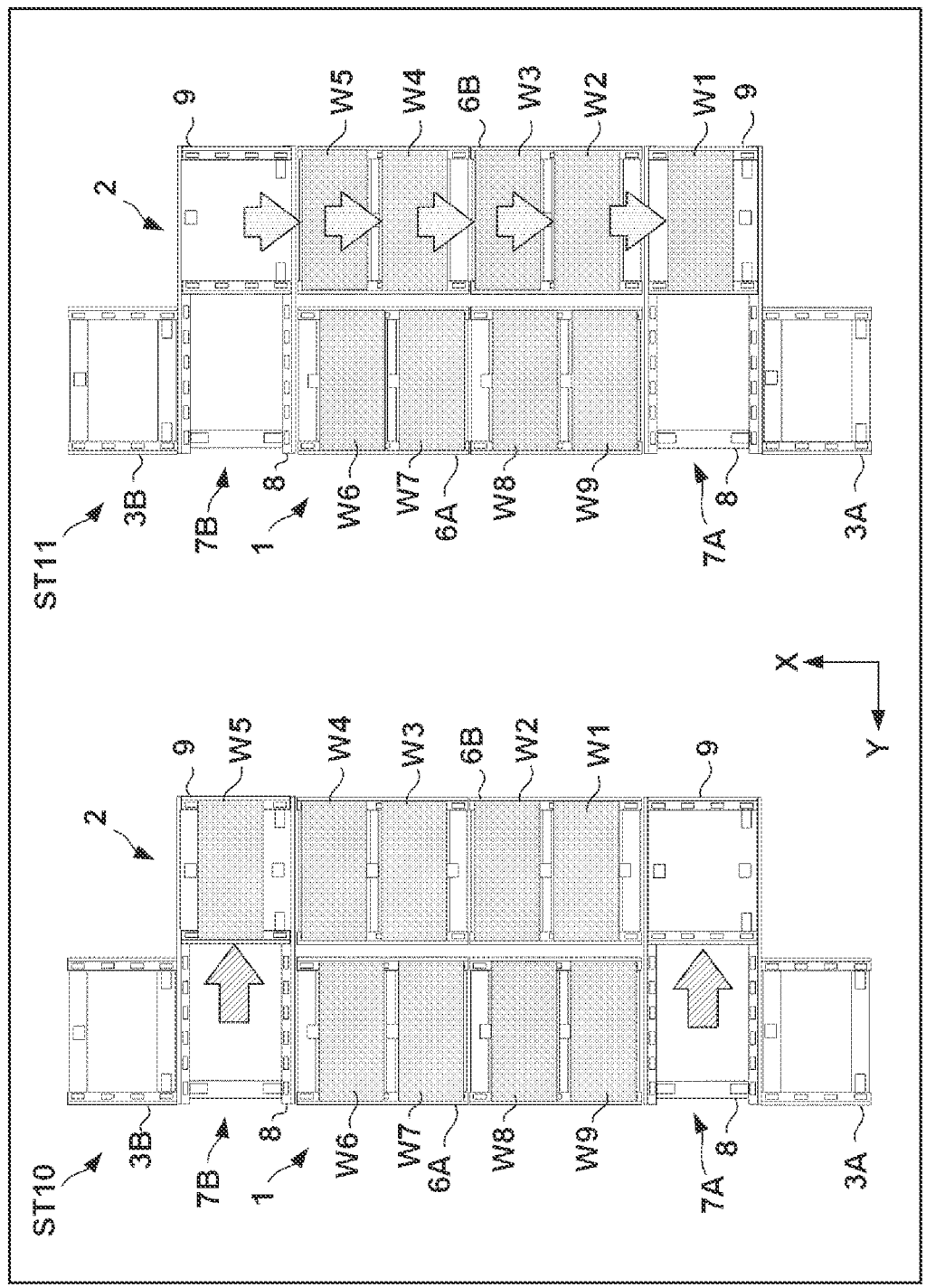
FIG. 6 is an explanatory view of the example of the operation of the automated warehouse equipment shown in FIG. 1.

As indicated by a state ST7 in FIG. 5, the storage target object W1 is transferred from the transportation conveyor 9 of the transfer unit 7B to the fixed conveyor 6B. After that, the transportation conveyor 9 of the transfer unit 7B is moved from the stop position B to the original stop position A. As indicated by a state ST8 in FIG. 5, the fixed conveyor 6B conveys the storage target object W1 toward the transfer unit 7A. The storage target object W2 is transferred from the fixed conveyor 6A to the transportation conveyor 9 of the transfer unit 7B. The storage target objects W3 to W5 are conveyed by the fixed conveyor 6A and thus their storage positions are shifted toward the transfer unit 7B by one object. The storage target object W6 is transferred from the transportation conveyor 9 of the transfer unit 7A to the fixed conveyor 6A.

By repeating this conveyance operation, it is possible to store up to nine storage target objects W1 to W9 in the automated warehouse unit 2, as indicated by a state ST9 in FIG. 5. A case in which the storage target object W1 is shipped in the state ST9 shown in FIG. 5 will be described. As indicated by a state ST10 in FIG. 6, the control device 11 first moves the transportation conveyor 9 of the transfer unit 7A from the stop position A to the stop position B. At this time, the transportation conveyor 9 of the transfer unit 7B is moved from the stop position A to the stop position B together with the storage target object W5. As indicated by a state ST11 in FIG. 6, the storage target object W1 is transferred from the fixed conveyor 6B to the transportation conveyor 9 of the transfer unit 7A. After that, the storage target objects W2 to W4 are conveyed by the fixed conveyor 6B and thus their storage positions are shifted toward the transfer unit 7A by one object. The storage target object W5 is transferred from the transportation conveyor 9 of the transfer unit 7B to the fixed conveyor 6B.

Figure 7:
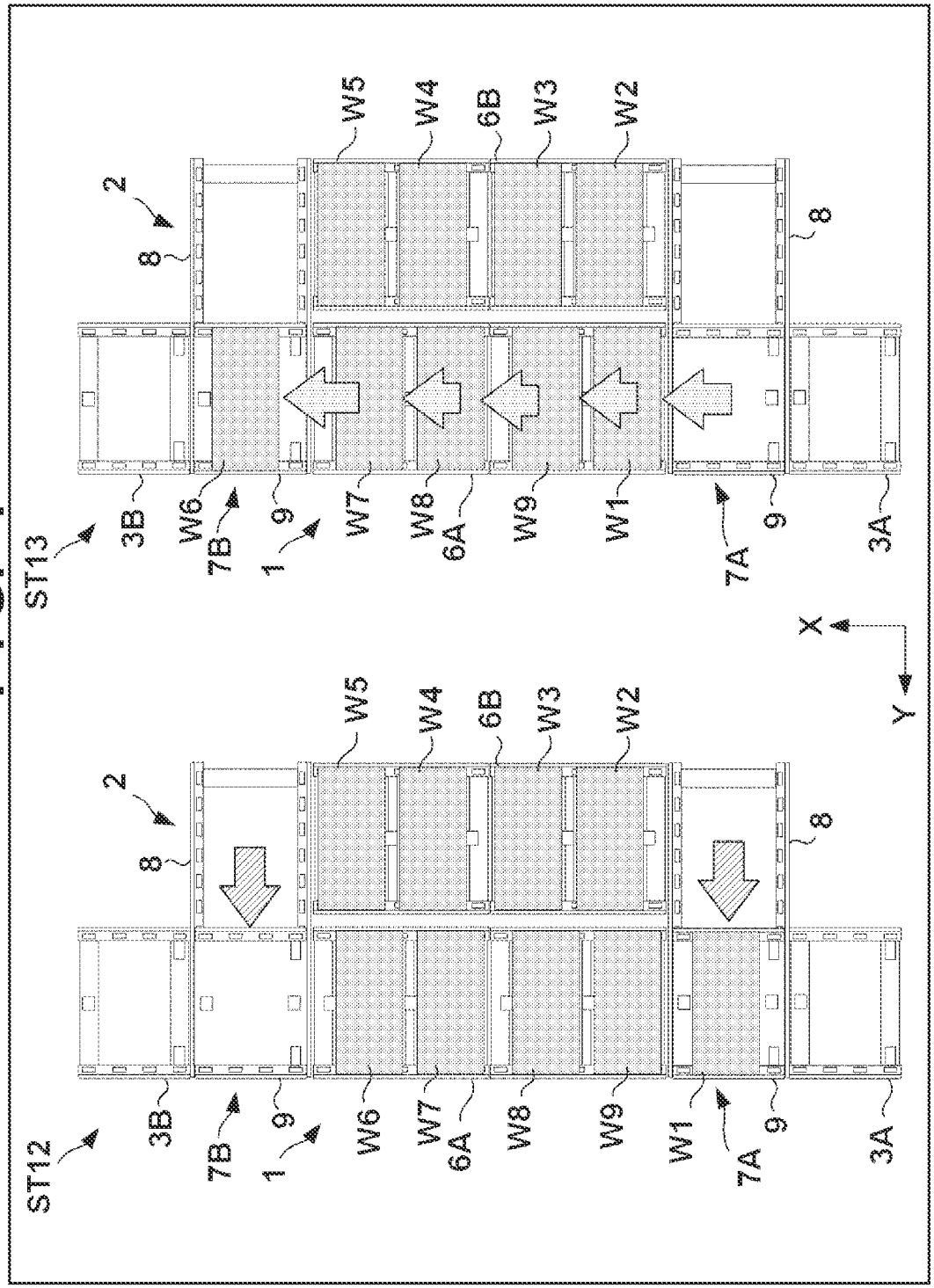
FIG. 7 is an explanatory view of the example of the operation of the automated warehouse equipment shown in FIG. 1.

As indicated by a state ST12 in FIG. 7, the transportation conveyor 9 of the transfer unit 7A is moved from the stop position B to the stop position A together with the storage target object W1, and the transportation conveyor 9 of the transfer unit 7B is also moved from the stop position B to the stop position A. As indicated by a state ST13 in FIG. 7, the storage target object W6 is transferred from the fixed conveyor 6A to the transportation conveyor 9 of the transfer unit 7B. After that, the storage target objects W7 to W9 are conveyed by the fixed conveyor 6A, and thus their storage positions are shifted toward the transfer unit 7B by one object. The storage target object W1 is transferred from the transportation conveyor 9 of the transfer unit 7A to the fixed conveyor 6A.

The state ST13 shown in FIG. 7 is the same state as the state ST9 shown in FIG. 5 except for the storage positions of the storage target objects W1 to W9. After that, by repeating the operations in the states ST10 to ST12, the storage target object W1 is finally transferred to the transportation conveyor 9 of the transfer unit 7B. Then, the storage target object W1 can be transferred from the transportation conveyor 9 to the unloading device 3B, as indicated by the state ST4 in FIG. 4.

As described above, in this embodiment, in the automated warehouse unit 2, the storage target objects can circulatively be conveyed. Therefore, for example, if it is necessary to unload the storage target object W2 in the state ST9 in FIG. 5, it is possible to unload only the storage target object W2 by repeating the operations in the states ST10 to ST12 until the storage target object W2 reaches the transportation conveyor 9 of the transfer unit 7B. That is, before unloading the desired storage target object W2, it is unnecessary to unload the undesired storage target objects W1 and W3 to W9 once. Therefore, the efficiency of the loading/unloading work is high in terms of a work process and work time. It is thus possible to efficiently load/unload only a desired storage target object.

Note that in this embodiment, the circulation conveyance direction of the storage target objects is set to the clockwise direction in the planar view. However, conveyance control of the automated warehouse unit 2 may be performed in the counterclockwise direction. In the case of the counterclockwise direction, the storage target objects are circulatively conveyed in an order of the transfer unit 7A→the fixed conveyor 6B→the transfer unit 7B→the fixed conveyor 6A→the transfer unit 7A. When changing the circulation conveyance direction, it can be implemented by only changing the storage positions (the positions of the stopping devices 61). Conveyance control may be allowed in both the clockwise direction and the counterclockwise direction. In this case, by installing the stopping device 61 at each of the positions corresponding to conveyance control in both the directions, it is possible to switch the circulation conveyance direction of the storage target objects in accordance with a situation. Thus, when unloading a desired storage target object, by performing circulation conveyance on the conveyance path in a direction in which the shortest distance is obtained, it is possible to shorten the time until the predetermined storage target object is unloaded, thereby improving the unloading efficiency of the storage target object.

Second Embodiment

Figure 8:
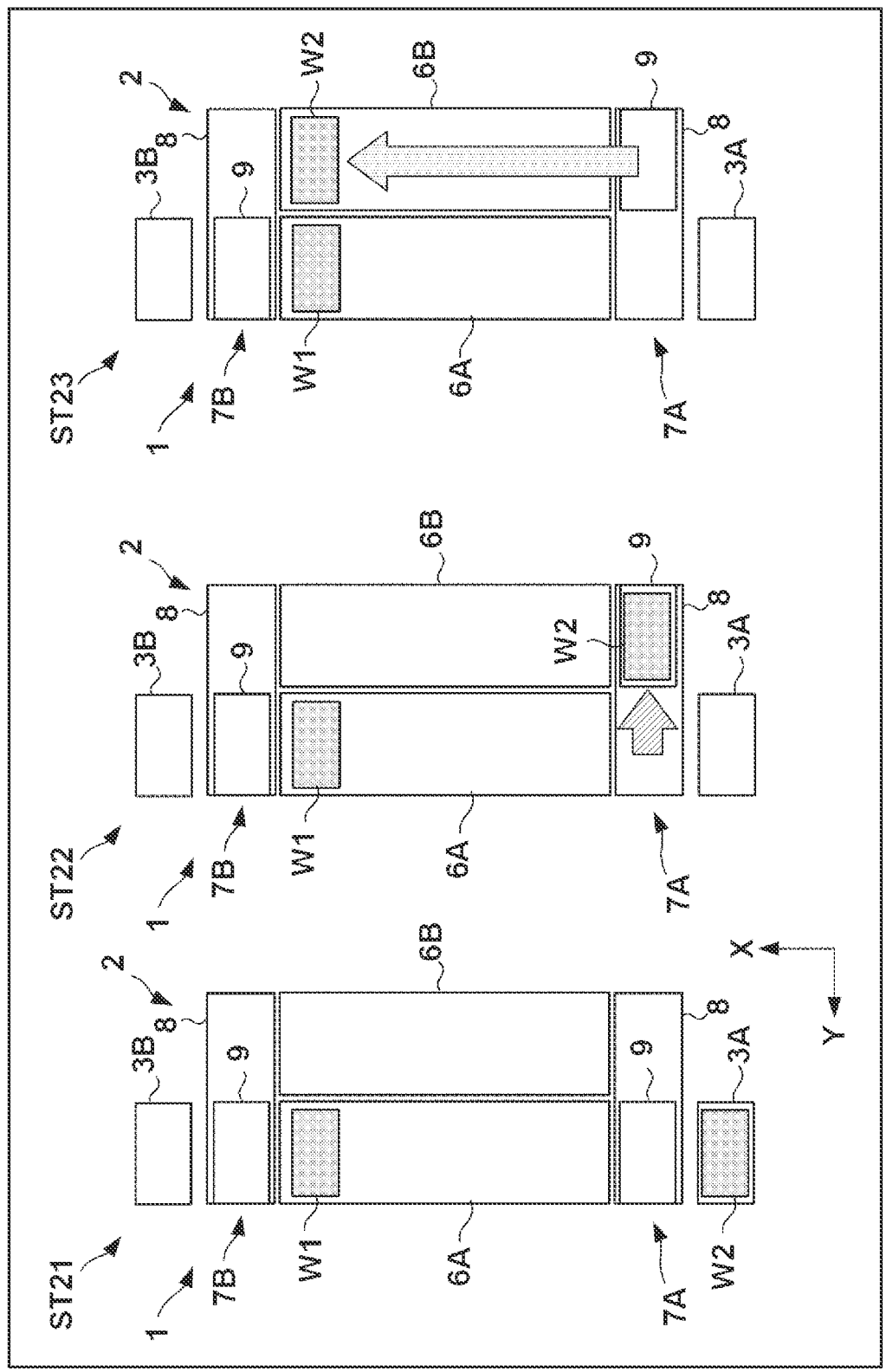
FIG. 8 is an explanatory view of another example of the operation of the automated warehouse equipment shown in FIG. 1.

In the first embodiment, it is possible to unload only a desired storage target object without unloading other storage target objects by performing circulation conveyance of the storage target objects. However, an arrangement in which no circulation conveyance is performed can be adopted. FIG. 8 schematically shows an example in which no circulation conveyance is performed. The arrangement of an automated warehouse unit 2 is the same as in the first embodiment. However, in terms of control, the conveyance directions of storage target objects by fixed conveyors 6A and 6B are the same (the direction from a loading device 3A to an unloading device 3B in FIG. 8). On the fixed conveyor 6B, storage target objects are sequentially stored from the side of a transfer unit 7B to the side of a transfer unit 7A, and thus storage positions (the positions of stopping devices 61) are different from those in the first embodiment.

In a state ST21 shown in FIG. 8, a first storage target object W1 is loaded, and stored at a storage position in an end portion of the fixed conveyor 6A on the side of the transfer unit 7B. Then, a next storage target object W2 is to be loaded. The storage target object W2 is transferred from the loading device 3A to a transportation conveyor 9 of the transfer unit 7A, and then the transportation conveyor 9 is moved from a stop position A to a stop position B together with the storage target object W2, as indicated by a state ST22. After that, as indicated by a state ST23, the storage target object W2 is transferred from the transportation conveyor 9 to the fixed conveyor 6B, and stored at a storage position in an end portion of the fixed conveyor 6B on the side of the transfer unit 7B.

After that, if the storage target object W1 is shipped, the storage target object W1 is transferred from the fixed conveyor 6A to the transportation conveyor 9 of the transfer unit 7B, and then transferred to the unloading device 3B. On the other hand, it is also possible to ship the storage target object W2 before the storage target object W1. In this case, the transportation conveyor 9 of the transfer unit 7B is moved to the stop position B, and then the storage target object W2 is transferred from the fixed conveyor 6B to the transportation conveyor 9 of the transfer unit 7B. After that, the transportation conveyor 9 of the transfer unit 7B is moved from the stop position B to the stop position A together with the storage target object W2, and then the storage target object W2 is transferred to the unloading device 3B.

By performing such control, it is possible to perform work storage of so-called "FIFO" with respect to two kinds of storage target objects, and to efficiently ship a desired storage target object out of the two kinds of storage target objects.

Third Embodiment

Figure 9:
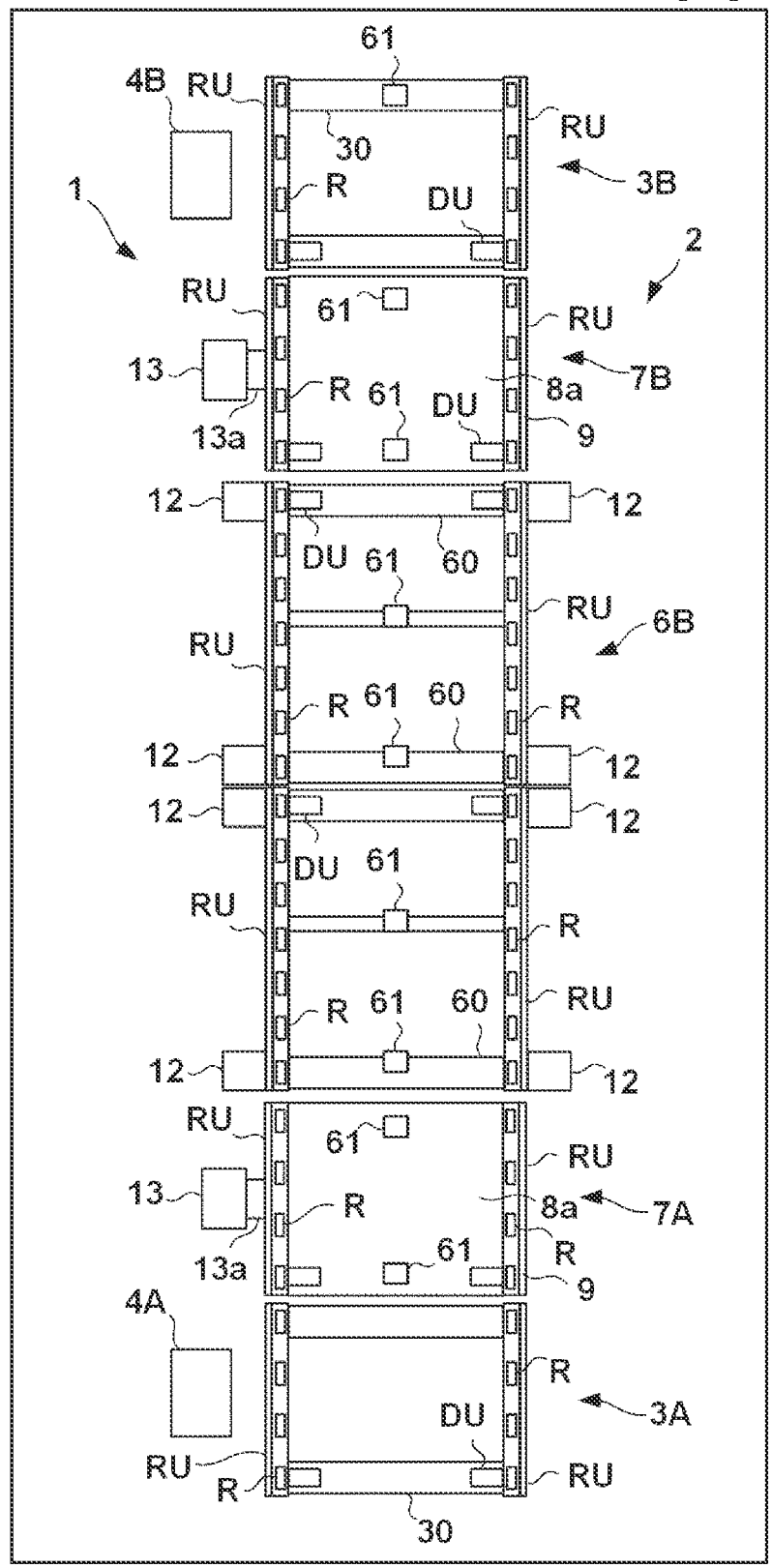
FIG. 9 is a plan view of an automated warehouse equipment according to another embodiment.
Figure 10:
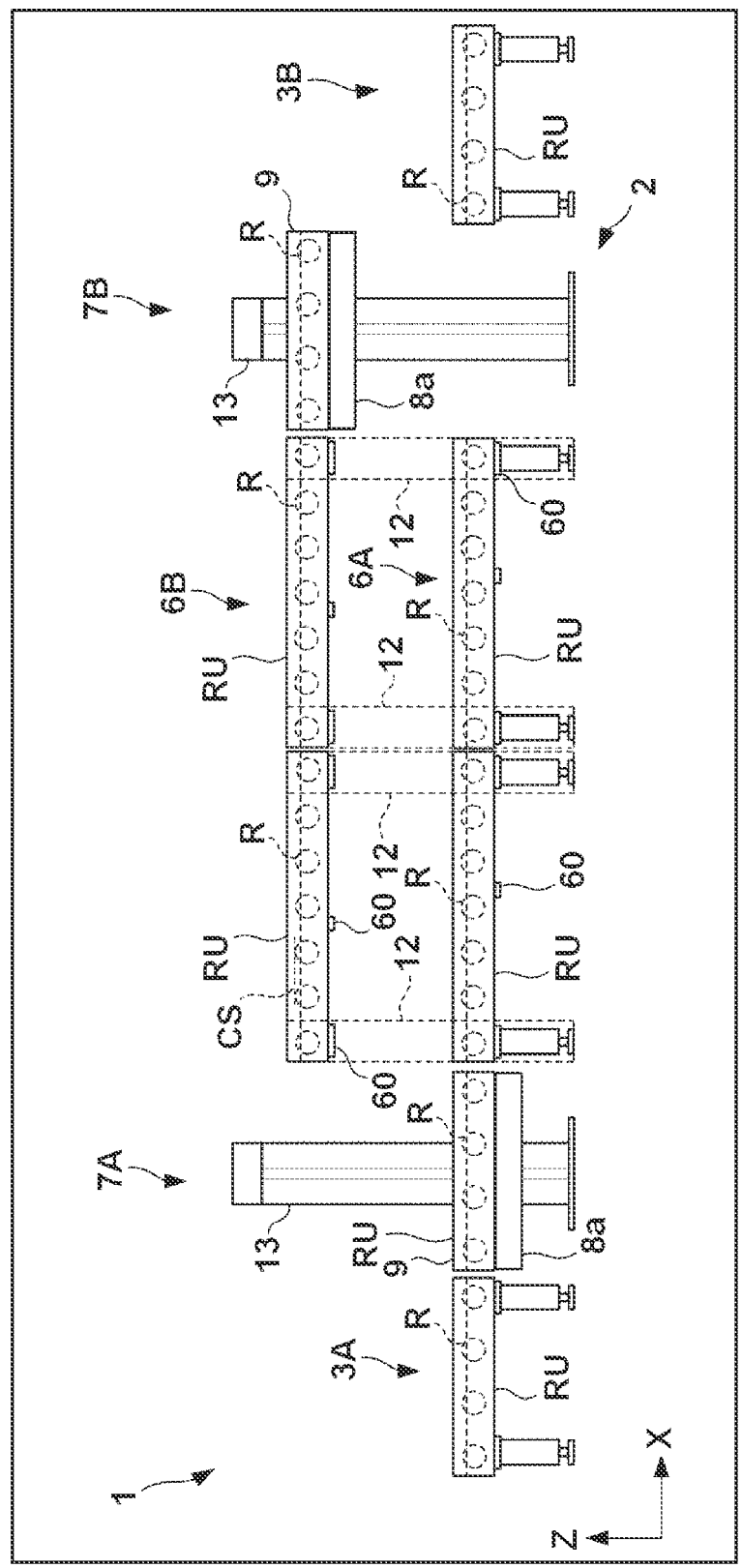
FIG. 10 is a side view of the automated warehouse equipment according to the other embodiment.

The first embodiment has exemplified the arrangement of performing horizontal circulation conveyance of storage target objects but an arrangement of performing vertical circulation conveyance can also be adopted. FIG. 9 is a plan view of an automated warehouse equipment 1 according to this embodiment. FIG. 10 is a side view of the automated warehouse equipment 1. Components different from the first embodiment will be described below.

In an automated warehouse unit 2 according to this embodiment, fixed conveyors 6A and 6B are arranged on the upper and lower sides. More specifically, the fixed conveyor 6B is supported by a plurality of columns 12 above the fixed conveyor 6A, and the fixed conveyors are arranged to overlap each other in the vertical direction.

A transfer unit 7 includes a moving device 13 instead of the moving device 8. The moving device 13 is a lifting device that reciprocally moves a moving body 8a in the Z direction. The moving body 8a is supported by the moving device 13 via a connecting portion 13a in a cantilevered state.

A transportation conveyor 9 of the transfer unit 7 is reciprocally moved between a stop position A on the lower side and a stop position B on the upper side. In the example shown in FIG. 10, a transportation conveyor 9 of a transfer unit 7A is located at the stop position A, and a transportation conveyor 9 of a transfer unit 7B is located at the stop position B. A conveyance surface CS of the transportation conveyor 9 of the transfer unit 7 has the same height as that of a loading device 3A, the fixed conveyor 6A, and an unloading device 3B when the transportation conveyor 9 is located at the stop position A, and has the same height as that of the fixed conveyor 6B when located when the transportation conveyor 9 is located at the stop position B.

With respect to a control operation, only the moving direction of the transportation conveyor 9 and the arrangement direction of the fixed conveyors 6A and 6B are the vertical direction, and the same control operation as in the first and second embodiments can be executed. For the automated warehouse unit 2 of this embodiment, the footprint of an automated warehouse is small and the height of a warehouse building can be effectively used. Therefore, the space utilization efficiency is high, as compared with the first and second embodiments.

Fourth Embodiment

Figure 11:
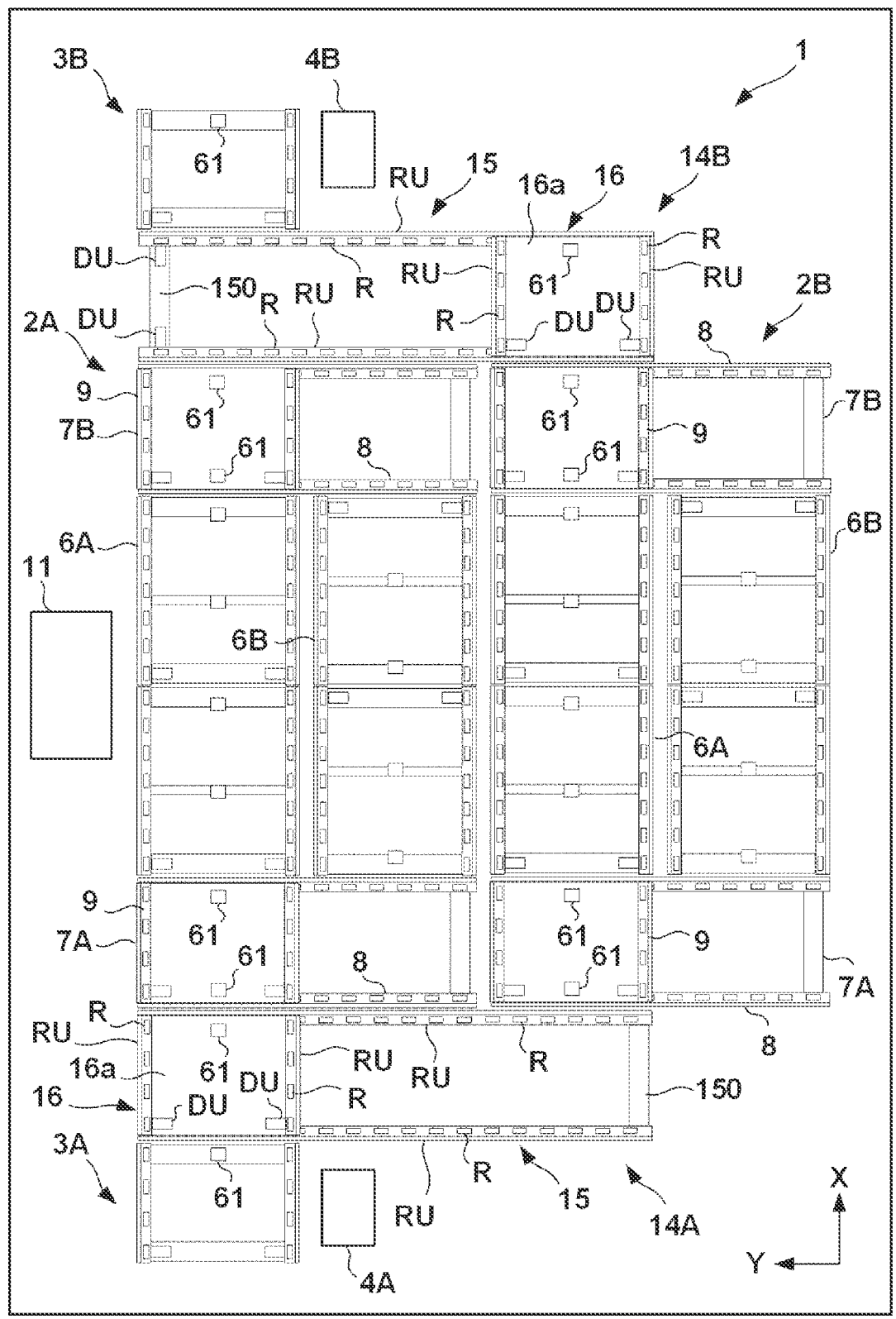
FIG. 11 is a plan view of an automated warehouse equipment according to still another embodiment.

The first embodiment has exemplified the automated warehouse equipment 1 including the one automated warehouse unit 2. However, the automated warehouse equipment 1 may be formed by a plurality of automated warehouse units 2. FIG. 11 is a plan view of an automated warehouse equipment 1 as an example.

In the automated warehouse equipment 1 of this embodiment, two automated warehouse units 2A and 2B are arrayed in the Y direction. Each of the automated warehouse units 2A and 2B is a unit having the same arrangement as that of the automated warehouse unit 2 described in the first embodiment. A receiving-side transfer device 14A is arranged between a loading device 3A and the two automated warehouse units 2A and 2B, and a shipping-side transfer device 14B is arranged between an unloading device 3B and the two automated warehouse units 2A and 2B. Each of the transfer devices 14A and 14B extends in the array direction (Y direction) of the two automated warehouse units 2A and 2B as a whole. The transfer device 14A is arranged on one side (the side of the loading device 3A) in the X direction of the two automated warehouse units 2A and 2B, and the transfer device 14B is arranged on the other side (the side of the unloading device 3B) in the X direction of the two automated warehouse units 2A and 2B. The transfer device 14A is adjacent to a transfer unit 7A and extends in parallel to the transfer unit 7A, and the transfer device 14B is adjacent to a transfer unit 7B and extends in parallel to the transfer unit 7B.

In this embodiment, the transfer devices 14A and 14B basically have the same structure, and will be referred to as a transfer device 14 hereinafter when they need not particularly be discriminated. In this embodiment, the transfer device 14 has the same arrangement as that of the transfer unit 7. The transfer device 14 includes a moving device 15 that moves a moving body 16a in the Y direction, and a transportation conveyor 16 supported by the moving body 16a. In this embodiment, the moving device 15 is a roller conveyor that reciprocally moves the moving body 16a in the Y direction.

In this embodiment, the moving device 15 is formed by a set of two roller units RU separated in the X direction. Each roller unit RU is extended in the Y direction, and has the same arrangement as that of the roller unit RU described with respect to the fixed conveyor 6 except for the number of rollers R. The rows of the two roller units RU separated in the X direction are arrayed to be parallel to each other by being connected by a plurality of frames 150 extended in the X direction. The moving body 16*a* is a plate-like member placed on the rollers R, and is moved in the Y direction by the rotation of the rollers R.

Note that the moving device 15 may be another kind of conveyor such as a belt conveyor. Alternatively, the moving device 15 may be a mechanism for reciprocally moving a moving body 15*a*, other than the conveyor, and may be, for example, a ball screw mechanism, a belt transmission mechanism, or a linear motor.

The transportation conveyor 16 is mounted on the moving body 15*a*, and fixed to the moving body 15*a*. The transportation conveyor 16 is a roller conveyor in this embodiment but may be another kind of conveyor such as a belt conveyor. In this embodiment, the transportation conveyor 16 is formed by a set of two roller units RU separated in the Y direction. Each roller unit RU is extended in the X direction, and has the same arrangement as that of the roller unit RU described with respect to the fixed conveyor 6 except for the number of rollers R. The rows of the two roller units RU separated in the Y direction are arrayed to be parallel to each other by being connected by the moving body 16*a*.

The transportation conveyor 16 can transfer a storage target object in both directions in the X direction. The conveyance surfaces of the transportation conveyor 16 and a transportation conveyor 9 of the transfer unit 7 have the same height. The transportation conveyor 16 of the transfer device 14A receives a storage target object from the loading device 3A, and transfers the storage target object to the transportation conveyor 9 of the transfer unit 7A. The transportation conveyor 16 of the transfer device 14B receives a storage target object from the transportation conveyor 9 of the transfer unit 7B, and transfers the storage target object to the unloading device 3B. In this embodiment, the moving device 15 reciprocally moves the transportation conveyor 16 fixed to the moving body 15*a* between two stop positions by moving the moving body 15*a*. Therefore, the transportation conveyor 16 can be regarded as a moving conveyor. The moving body 16*a* is stopped by, for example, contacting a stopper provided at each stop position in the moving device 15.

One of the two stop positions of the transportation conveyor 16 of the transfer device 14A is a position at which the transportation conveyor 16 faces the transfer unit 7A of the automated warehouse unit 2A. More specifically, one of the two stop positions is a position at which the transportation conveyor 16 faces the transfer unit 7A of the automated warehouse unit 2A when the transfer unit 7A stops at a stop position A. This stop position will be referred to as a stop position C1 hereinafter. In the example shown in FIG. 11, the transportation conveyor 16 of the transfer device 14A stops at the stop position C1. At the stop position C1, the roller units RU of the transportation conveyor 16, the roller units RU of the loading device 3A, the transfer unit 7A of the automated warehouse unit 2A at the stop position A, and the roller units RU of the fixed conveyor 6A of the automated warehouse unit 2A are aligned (the positions in the Y direction coincide with each other, respectively).

The other of the two stop positions of the transportation conveyor 16 of the transfer device 14A is a position at which the transportation conveyor 16 faces the transfer unit 7A of the automated warehouse unit 2B. More specifically, the other of the two stop positions is a position at which the transportation conveyor 16 faces the transfer unit 7A of the automated warehouse unit 2B when the transfer unit 7A stops at the stop position A. This stop position will be referred to as a stop position D1 hereinafter. At the stop position D1, the roller units RU of the transportation conveyor 16, the transfer unit 7A of the automated warehouse unit 2B at the stop position A, and the roller units RU of the fixed conveyor 6A of the automated warehouse unit 2B are aligned (the positions in the Y direction coincide with each other, respectively).

One of the two stop positions of the transportation conveyor 16 of the transfer device 14B is a position at which the transportation conveyor 16 faces the transfer unit 7B of the automated warehouse unit 2A. More specifically, one of the two stop positions is a position at which the transportation conveyor 16 faces the transfer unit 7B of the automated warehouse unit 2A when the transfer unit 7B stops at the stop position A. This stop position will be referred to as a stop position C2 hereinafter. At the stop position C2, the roller units RU of the transportation conveyor 16, the roller units RU of the unloading device 3B, the transfer unit 7B of the automated warehouse unit 2A at the stop position A, and the roller units RU of the fixed conveyor 6A of the automated warehouse unit 2A are aligned (the positions in the Y direction coincide with each other, respectively).

The other of the two stop positions of the transportation conveyor 16 of the transfer device 14B is a position at which the transportation conveyor 16 faces the transfer unit 7B of the automated warehouse unit 2B. More specifically, the other of the two stop positions is a position at which the transportation conveyor 16 faces the transfer unit 7B of the automated warehouse unit 2B when the transfer unit 7B stops at the stop position A. This stop position will be referred to as a stop position D2 hereinafter. In the example shown in FIG. 11, the transportation conveyor 16 of the transfer device 14B stops at the stop position D2. At the stop position D2, the roller units RU of the transportation conveyor 16, the transfer unit 7B of the automated warehouse unit 2B at the stop position A, and the roller units RU of the fixed conveyor 6A of the automated warehouse unit 2B are aligned (the positions in the Y direction coincide with each other, respectively).

The transportation conveyor 16 of the transfer device 14 includes a stopping device 61 that defines the storage position of a storage target object. The stopping device 61 of the transfer device 14A is provided in the moving body 16*a* on the side of the transfer unit 7A. The stopping device 61 of the transfer device 14B is provided in the moving body 16*a* on the side of the unloading device 3B. The transportation conveyor 16 may include an anti-back mechanism or the like for preventing the storage target object from unintentionally moving toward the loading device 3A or the transfer unit 7B and dropping.

In this embodiment, a control device 11 can manage reception/shipping of a storage target object for each of the two automated warehouse units 2A and 2B. When receiving a storage target object in the automated warehouse unit 2A, the conveyance target object is transferred in an order of the loading device 3A→the transportation conveyor 16 (stop position C1) of the transfer device 14A→the transfer unit 7A (stop position A) of the automated warehouse unit 2A→the fixed conveyor 6A of the automated warehouse unit 2A. When receiving a storage target object in the automated warehouse unit 2B, the conveyance target object is transferred in an order of the loading device 3A→the transportation conveyor 16 (stop position C1) of the transfer device 14A→movement to the stop position D1 on the transportation conveyor 16→the transfer unit 7A (stop position A) of the automated warehouse unit 2B→the fixed conveyor 6A of the automated warehouse unit 2B.

When shipping a storage target object from the automated warehouse unit 2A, the conveyance target object is transferred in an order of the transfer unit 7B (stop position A) of the automated warehouse unit 2A→the transportation conveyor 16 (stop position C2) of the transfer device 14B→the unloading device 3B, and shipped from the unloading device 3B. When shipping a storage target object from the automated warehouse unit 2B, the conveyance target object is transferred and conveyed in an order of the transfer unit 7B (stop position A) of the automated warehouse unit 2B→the transportation conveyor 16 (stop position D2) of the transfer device 14B→movement to the stop position C2 on the transportation conveyor 16→the unloading device 3B, and shipped from the unloading device 3B.

It is also possible to transfer a storage target object from the automated warehouse unit 2A to the automated warehouse unit 2B. In this case, the storage target object is transferred in an order of the transfer unit 7B (stop position A) of the automated warehouse unit 2A→the transportation conveyor 16 (stop position C2) of the transfer device 14B→movement to the stop position D2 on the transportation conveyor 16 of the transfer device 14B→the transfer unit 7B (stop position A) of the automated warehouse unit 2B. At this time, it is also possible to transfer the storage target object from the automated warehouse unit 2A to the automated warehouse unit 2B using the transfer device 14B instead of the transfer device 14A. This temporarily loads the storage target object into the automated warehouse unit 2A to preferentially perform a loading work, and then the storage target object can be distributed to the automated warehouse unit 2A or 2B using an idling time such as a shipping waiting time. That is, it is possible to flexibly load and store a storage target object in accordance with the degree of congestion of works.

Furthermore, in addition to transfer from the automated warehouse unit 2A to the automated warehouse unit 2B, it is possible to transfer a storage target object from the automated warehouse unit 2B to the automated warehouse unit 2A. Thus, even if the storage target object is temporarily stored in the automated warehouse unit 2B, it can be stored in the automated warehouse unit 2A in accordance with the demand for shipping. As a result, storage target objects of high demand can always be stored in the automated warehouse unit 2A, and thus, when shipping a storage target object which is required to be shipped rapidly, that is, a so-called "quick delivery product", it is possible to quickly ship the storage target object.

As described above, in this embodiment, by providing the plurality of automated warehouse units 2, the storing amount of storage target objects can be increased. The two automated warehouse units 2A and 2B are provided in the example shown in FIG. 11 but the number of automated warehouse units 2 may be three or more. In this case, the three or more automated warehouse units 2 are arranged in the Y direction, and the length in the Y direction of each of the transfer devices 14A and 14B is extended in accordance with the number of automated warehouse units 2. The number of stop positions of the transportation conveyor 16 of each of the transfer devices 14A and 14B is increased in accordance with the number of automated warehouse units 2. To increase the number of stop positions, the stopping device 61 of the first embodiment may be used, or a sensor that detects arrival of the transportation conveyor 16 may be provided at each stop position and movement of the transportation conveyor 16 may be controlled to stop based on the detection result of the sensor.

Fifth Embodiment

Figure 12:
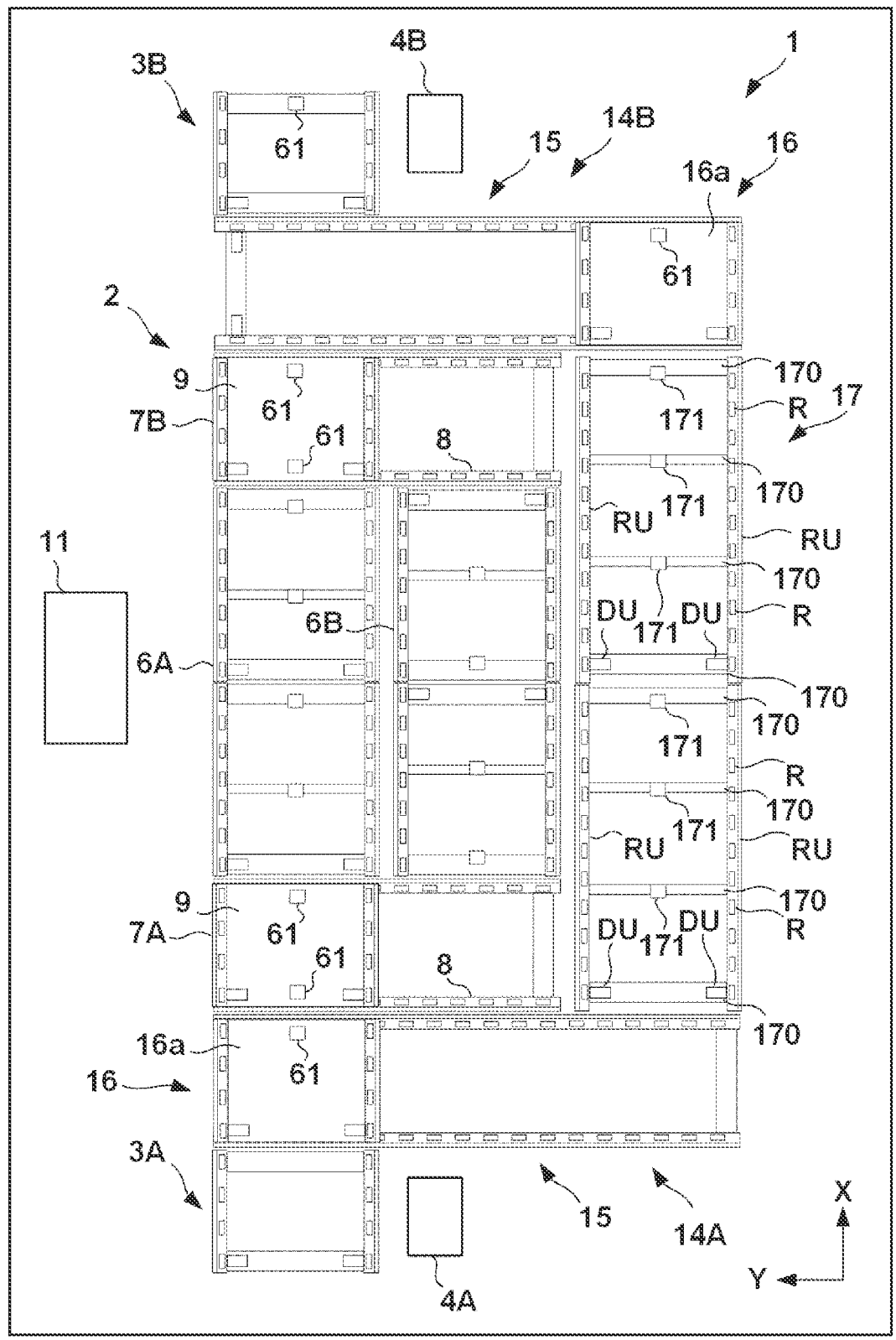
FIG. 12 is a plan view of an automated warehouse equipment according to still another embodiment.

The fourth embodiment has exemplified the automated warehouse equipment 1 including the plurality of automated warehouse units 2. However, the automated warehouse equipment may be formed by including the automated warehouse unit 2 and another kind of storage conveyor. FIG. 12 is a plan view of an automated warehouse equipment 1 as an example.

In the automated warehouse equipment 1 of this embodiment, an automated warehouse unit 2 and a fixed conveyor 17 are arrayed in the Y direction. The automated warehouse unit 2 is a unit having the same arrangement of the automated warehouse unit 2 described in the first embodiment. The fixed conveyor 17 extends in the X direction, and has a length in the X direction (the conveyance distance of a storage target object) that is equal to that of the automated warehouse unit 2.

The fixed conveyor 17 of this embodiment is a roller conveyor but may be another kind of conveyor such as a belt conveyor. The fixed conveyor 17 has a function capable of conveying a storage target object in both directions in the X direction. However, in this embodiment, in a control operation, the fixed conveyor 17 only conveys a storage target object from the side of a transfer device 14A to a side of a transfer device 14B, and does not convey a storage target object from the side of the transfer device 14B to the side of the transfer device 14A.

The fixed conveyor 17 of this embodiment has the same arrangement as that of a fixed conveyor 6 of the automated warehouse unit 2, and is formed by sequentially arranging, in the X direction, sets each including two roller units RU separated in the Y direction. The rows of the two roller units RU separated in the Y direction are arrayed to be parallel to each other by being connected by a plurality of frames 170 extended in the Y direction. The conveyance surfaces of the fixed conveyor 17 and the fixed conveyor 6 of the automated warehouse unit 2 have the same height.

The fixed conveyor 17 includes a plurality of stopping devices 171 each of which defines the storage position of a storage target object. Each stopping device 171 has the same arrangement as that of the stopping device 61 of the first embodiment. A control device 11 drives the stopping device 171 to stop the storage target object at the storage position. The storage target object is sequentially placed and stored on the fixed conveyor 17 from the side of the transfer device 14B. Note that a method other than the method using the stopping device 170 can be adopted to control the storage position of the storage target object. For example, a sensor that detects arrival of a storage target object may be provided at each storage position, and conveyance of the storage target object may be controlled based on the detection result of the sensor to stop the storage target object at the storage position.

The receiving-side transfer device 14A is arranged between a loading device 3A and the automated warehouse unit 2 and fixed conveyor 17, and the shipping-side transfer device 14B is arranged between an unloading device 3B and the automated warehouse unit 2 and fixed conveyor 17. Each of the transfer devices 14A and 14B extends in the array direction (Y direction) of the automated warehouse unit 2 and the fixed conveyor 17 as a whole. The transfer device 14A is arranged on one side (the side of the loading device 3A) in the X direction of the automated warehouse unit 2 and the fixed conveyor 17, and the transfer device 14B is arranged on the other side (the side of the unloading device 3B) in the X direction of the automated warehouse unit 2 and the fixed conveyor 17. The transfer device 14A is adjacent to a transfer unit 7A and extends in parallel to the transfer unit 7A, and the transfer device 14B is adjacent to a transfer unit 7B and extends in parallel to the transfer unit 7B.

The arrangement of the transfer devices 14A and 14B is the same as that of the transfer devices 14A and 14B of the fourth embodiment. However, the stop position of a transportation conveyor 16 is different.

One of the two stop positions of the transportation conveyor 16 of the transfer device 14A is a position at which the transportation conveyor 16 faces the transfer unit 7A of the automated warehouse unit 2. More specifically, one of the two stop positions is a position at which the transportation conveyor 16 faces the transfer unit 7A of the automated warehouse unit 2 when the transfer unit 7A stops at a stop position A. This stop position will be referred to as a stop position C1' hereinafter. In the example shown in FIG. 12, the transportation conveyor 16 of the transfer device 14A stops at the stop position C1'. At the stop position C1', roller units RU of the transportation conveyor 16, roller units RU of the loading device 3A, the transfer unit 7A of the automated warehouse unit 2 at the stop position A, and roller units RU of a fixed conveyor 6A of the automated warehouse unit 2 are aligned (the positions in the Y direction coincide with each other, respectively).

The other of the two stop positions of the transportation conveyor 16 of the transfer device 14A is a position at which the transportation conveyor 16 faces the fixed conveyor 17. This stop position will be referred to as a stop position D1' hereinafter. At the stop position D1', the roller units RU of the transportation conveyor 16 and the roller units RU of the fixed conveyor 17 are aligned (the positions in the Y direction coincide with each other, respectively).

One of the two stop positions of the transportation conveyor 16 of the transfer device 14B is a position at which the transportation conveyor 16 faces the transfer unit 7B of the automated warehouse unit 2. More specifically, one of the two stop positions is a position at which the transportation conveyor 16 faces the transfer unit 7B of the automated warehouse unit 2 when the transfer unit 7B stops at the stop position A. This stop position will be referred to as a stop position C2' hereinafter. At the stop position C2', roller units RU of the transportation conveyor 16, roller units RU of the unloading device 3B, the transfer unit 7B of the automated warehouse unit 2 at the stop position A, and the roller units RU of the fixed conveyor 6A of the automated warehouse unit 2 are aligned (the positions in the Y direction coincide with each other, respectively).

The other of the two stop positions of the transportation conveyor 16 of the transfer device 14B is a position at which the transportation conveyor 16 faces the fixed conveyor 17. This stop position will be referred to as a stop position D2' hereinafter. In the example shown in FIG. 12, the transportation conveyor 16 of the transfer device 14B stops at the stop position D2'. At the stop position D2', the roller units RU of the transportation conveyor 16 and the roller units RU of the fixed conveyor 17 are aligned (the positions in the Y direction coincide with each other, respectively).

In this embodiment, the control device 11 can manage reception/shipping of a storage target object by discriminating between the automated warehouse unit 2 and the fixed conveyor 17. A plurality of storage target objects can be stored on the fixed conveyor 17 but can be unloaded only in the loading order of the storage target objects. That is, with respect to the fixed conveyor 17, only unloading of so-called "FIFO" can be performed. However, the structure and control are simple accordingly.

When receiving a storage target object in the automated warehouse unit 2, the conveyance target object is transferred in an order of the loading device 3A→the transportation conveyor 16 (stop position Cr1') of the transfer device 14A→the transfer unit 7A (stop position A) of the automated warehouse unit 2. When receiving a storage target object in the fixed conveyor 17, the conveyance target object is transferred in an order of the loading device 3A→the transportation conveyor 16 (stop position C1') of the transfer device 14A→movement to the stop position D1' on the transportation conveyor 16→the fixed conveyor 17.

When shipping a storage target object from the automated warehouse unit 2, the conveyance target object is transferred in an order of the transfer unit 7B (stop position A) of the automated warehouse unit 2→the transportation conveyor 16 (stop position C2') of the transfer device 14B→the unloading device 3B, and shipped from the unloading device 3B. When shipping a storage target object from the fixed conveyor 17, the conveyance target object is transferred and conveyed in an order of the fixed conveyor 17→the transportation conveyor 16 (stop position D2') of the transfer device 14B→movement to the stop position C2' on the transportation conveyor 16→the unloading device 3B, and shipped from the unloading device 3B.

As described above, in this embodiment, the automated warehouse equipment 1 is constructed by including the automated warehouse unit 2 and another kind of storage conveyor (the fixed conveyor 17). Then, among a plurality of kinds of storage target objects, storage target objects (to be referred to as frequently used works hereinafter) whose amount is large or which are frequently loaded and unloaded are stored in the fixed conveyor 17. This can maintain the unloading efficiency of the frequently used works, and also efficiently load/unload a desired storage target object with respect to storage target objects stored in the automated warehouse unit 2. One automated warehouse unit 2 and one fixed conveyor 17 are provided in the example shown in FIG. 12 but a plurality of automated warehouse units 2 and a plurality of fixed conveyors 17 may be provided. In this case, one or a plurality of automated warehouse units 2 and one or a plurality of fixed conveyors 17 are arranged in the Y direction, and the transfer devices 14A and 14B each having a length in the Y direction according to the number of automated warehouse units 2 and the number of fixed conveyors 17 are also provided. Furthermore, the stop position of the transportation conveyor 16 of each of the transfer devices 14A and 14B is appropriately decided in accordance with the number of automated warehouse units 2 and the number of fixed conveyors 17. The stopping device 61 of the first embodiment may be provided at each stop position, or a sensor that detects arrival of the transportation conveyor 16 may be provided at each stop position and movement of the transportation conveyor 16 may be controlled to stop based on the detection result of the sensor.

Sixth Embodiment

If a plurality of automated warehouse units 2 are provided as in the fourth embodiment, or an automated warehouse unit 2 and another kind of storage conveyor are included as in the fifth embodiment, each of transfer devices 14A and 14B becomes long in the Y direction as the number of automated warehouse units 2 or the number of storage conveyors increases. Therefore, a plurality of transfer devices 14A may be connected in the Y direction, and a plurality of transfer devices 14B may be connected in the Y direction.

Then, a receiving-side relay transfer device that transfers a storage target object between the adjacent transfer devices 14A and a shipping-side relay transfer device that transfers a storage target object between the adjacent transfer devices 14B may be provided.

Figure 13:
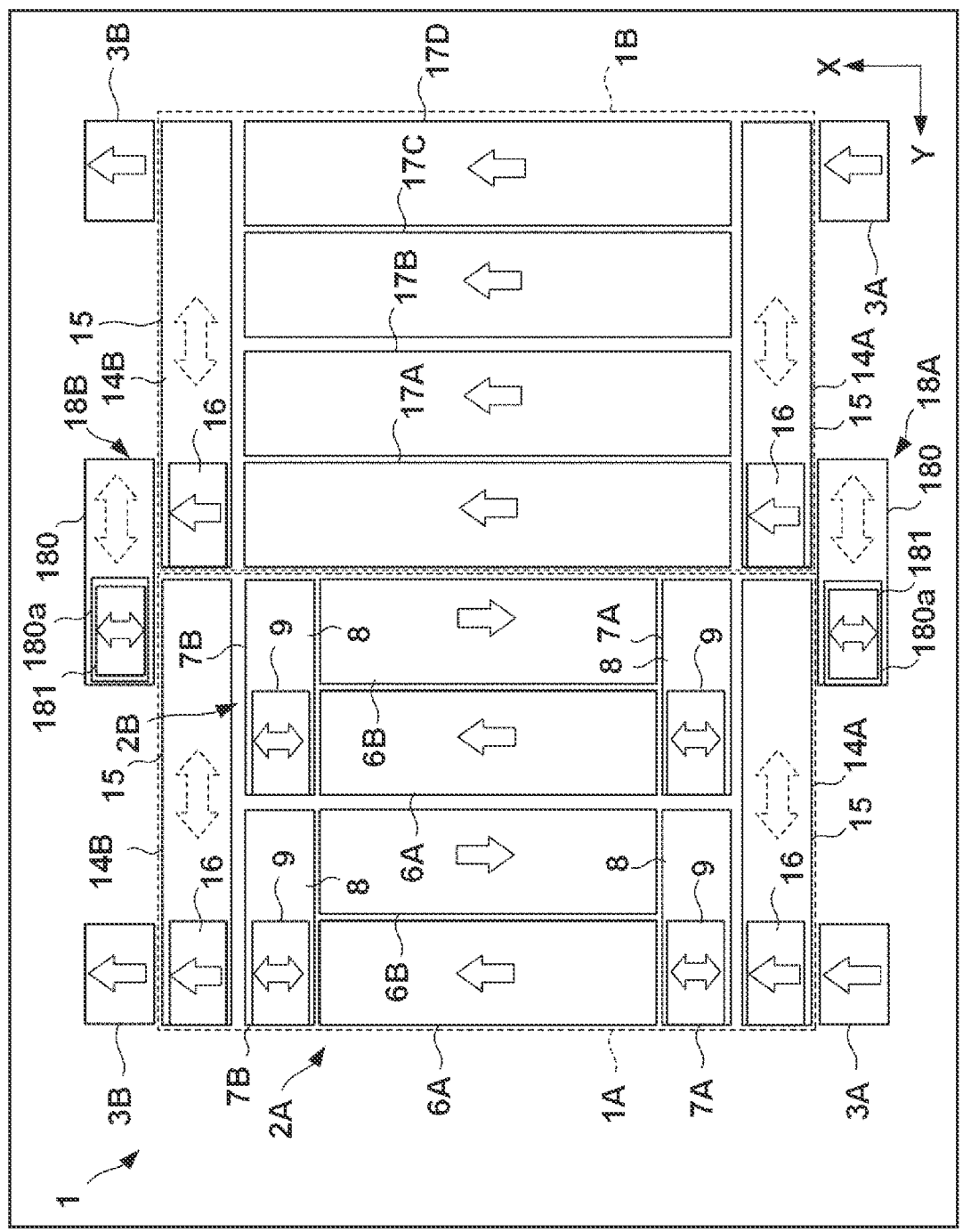
FIG. 13 is a view of the layout of an automated warehouse equipment according to still another embodiment.

Furthermore, a plurality of loading devices 3A and a plurality of unloading devices 3B may be provided. FIG. 13 is a view of the layout of an automated warehouse equipment 1 according to this embodiment. A solid arrow represents the conveyance direction of a storage target object, and a broken arrow represents the moving direction of a transportation conveyor 16 or 181.

The automated warehouse equipment 1 includes equipments 1A and 1B. The equipment 1A has the same arrangement as that of the automated warehouse equipment 1 of the fourth embodiment, and two automated warehouse units 2A and 2B are arranged between the two transfer devices 14A and 14B. The lengths in the Y direction of the two transfer devices 14A and 14B are set longer than those of the transfer devices 14A and 14B of the fourth embodiment, and the movement distance of the transportation conveyor 16 is long.

The stop positions of the transportation conveyor 16 of the transfer device 14A are, for example, the same position (corresponding to a stop position C1) in the Y direction as that of a fixed conveyor 6A of the automated warehouse unit 2A, the same position (corresponding to a stop position D1) in the Y direction as that of a fixed conveyor 6A of the automated warehouse unit 2B, and the same position (a position adjacent to the equipment 1B) in the Y direction as that of a fixed conveyor 6B of the automated warehouse unit 2B.

Similarly, the stop positions of the transportation conveyor 16 of the transfer device 14B are, for example, the same position (corresponding to a stop position C2) in the Y direction as that of the fixed conveyor 6A of the automated warehouse unit 2A, the same position (corresponding to a stop position D2) in the Y direction as that of the fixed conveyor 6A of the automated warehouse unit 2B, and the same position (a position adjacent to the equipment 1B) in the Y direction as that of the fixed conveyor 6B of the automated warehouse unit 2B.

In the equipment 1B, a plurality of fixed conveyors 17A to 17D are arranged between the transfer devices 14A and 14B. The fixed conveyors 17A to 17D have the same arrangement as that of the fixed conveyor 17 of the fifth embodiment, and the equipment 1B is an equipment formed by only the fixed conveyors 17 without using the automated warehouse unit 2 in the automated warehouse equipment 1 of the fifth embodiment. The two transfer devices 14A and 14B extend over the array range in the Y direction of the fixed conveyors 17A to 17D. The stop positions of the transportation conveyor 16 of each of the transfer devices 14A and 14B are positions (four positions in total) respectively facing the plurality of fixed conveyors 17A to 17D.

The automated warehouse equipment 1 includes the plurality of loading devices 3A and the plurality of unloading devices 3B. The automated warehouse equipment 1 includes the two loading devices 3A and the two unloading devices 3B in the example shown in FIG. 13 but may include three or more loading devices 3A and three or more unloading devices 3B. One of the two loading devices 3A transfers a storage target object to the transfer device 14A of the equipment 1A. That is, the one loading device 3A loads the storage target object. The other loading device 3A transfers a storage target object to the transfer device 14A of the equipment 1B. That is, the other loading device 3A unloads the storage target object. One of the two unloading devices 3B transfers a storage target object from the transfer device 14B of the equipment 1A. That is, the one unloading device 3B unloads the storage target object. The other unloading device 3B transfers a storage target object from the transfer device 14B of the equipment 1B. That is, the other unloading device 3B unloads the storage target object.

The automated warehouse equipment 1 includes a receiving-side relay transfer device 18A that transfers a storage target object between the adjacent transfer devices 14A and a shipping-side relay transfer device 18B that transfers a storage target object between the adjacent transfer devices 14B. The relay transfer device 18A is arranged adjacent to the connecting portion of the adjacent transfer devices 14A (end portions of the transfer devices 14A in the Y direction), and the relay transfer device 18B is arranged adjacent to the connecting portion of the adjacent transfer devices 14B (end portions of the transfer devices 14B in the Y direction).

In this embodiment, each of the relay transfer devices 18A and 18B has the same arrangement as that of the transfer unit 7 or the transfer device 14, and includes a moving device 180 (corresponding to the moving device 8 or 15) that reciprocally moves a moving body 180a (corresponding to the moving body 8a or 15a) in the Y direction, and the transportation conveyor 181 (corresponding to the transportation conveyor 9 or 16) supported by the moving body 180a. The transportation conveyor 181 can transfer a storage target object in both directions in the X direction.

The relay transfer device 18A can transfer a storage target object from the transfer device 14A of the equipment 1A to the transfer device 14A of the equipment 1B or from the transfer device 14A of the equipment 1B to the transfer device 14A of the equipment 1A. When transferring a storage target object from the transfer device 14A of the equipment 1A to the transfer device 14A of the equipment 1B, the transportation conveyor 181 and the transportation conveyor 16 of the transfer device 14A of the equipment 1A move to positions facing each other, and the storage target object is transferred from the transportation conveyor 16 to the transportation conveyor 181. After that, the transportation conveyor 181 is moved toward the equipment 1B.

The transportation conveyor 181 and the transportation conveyor 16 of the transfer device 14A of the equipment 1B move to positions facing each other, and then the storage target object is transferred from the transportation conveyor 181 to the transportation conveyor 16.

When transferring a storage target object from the transfer device 14A of the equipment 1B to the transfer device 14A of the equipment 1A, the transportation conveyor 181 and the transportation conveyor 16 of the transfer device 14A of the equipment 1B move to positions facing each other, and then the storage target object is transferred from the transportation conveyor 16 to the transportation conveyor 181. After that, the transportation conveyor 181 is moved toward the equipment 1A.

The transportation conveyor 181 and the transportation conveyor 16 of the transfer device 14A of the equipment 1A move to positions facing each other, and then the storage target object is transferred from the transportation conveyor 181 to the transportation conveyor 16. The transfer operation of the relay transfer device 18B is the same.

In this embodiment, it is possible to move a storage target object between the equipments 1A and 1B, and to select a storage destination in accordance with the storage capacity of each equipment and the kind of the storage target object. Note that in the example shown in FIG. 13, the equipment 1A is formed by the automated warehouse units 2A and 2B, and the equipment 1B is formed by the fixed conveyors 17A to 17D. However, both the equipments may be automated warehouse equipments each formed only by the automated warehouse unit 2, or one or both of the equipments may include the automated warehouse unit 2 and the fixed conveyor 17.

Although the embodiments of the invention are explained above, the invention is not limited to the foregoing embodiments, and various variations/changes are possible within the spirit of the invention.

What is claimed is:

1. An automated warehouse unit comprising:
   two rows of fixed conveyors, on which a storage target object is placed, configured to convey the storage target object in a first direction;
   a receiving-side transfer unit provided on one end portion side of the two rows of the fixed conveyors and extending in a second direction orthogonal to the first direction; and
   a shipping-side transfer unit provided on the other end portion side of the two rows of the fixed conveyors and extending in the second direction,
   wherein each of the receiving-side transfer unit and the shipping-side transfer unit includes
   a first moving device configured to reciprocally move a first moving body in the second direction between a position facing one fixed conveyor in the two rows of the fixed conveyors and a position facing the other fixed conveyor in the two rows of the fixed conveyors, and
   a first transportation conveyor supported by the first moving body and configured to transfer the storage target object to the two rows of the fixed conveyors in the first direction,
   each of the two rows of the fixed conveyors includes a plurality of first stopping device which are arranged along the first direction and are configured to contact the storage target object so as to stop conveying of the storage target object, and
   each of the plurality of first stopping device defines a storage position for one storage target object,
   an operation of the one fixed conveyor includes conveying the storage target object in a forward direction of the first direction,
   an operation of the other fixed conveyor includes conveying the storage target object in a backward direction of the first direction, and
   each of the plurality of first stopping device is located so as to contact a front portion of the storage target object in a conveyance direction.

2. The automated warehouse unit according to claim 1, wherein
   the two rows of the fixed conveyors are arranged on left and right sides, and
   conveyance paths of the receiving-side transfer unit, the one fixed conveyor, the shipping-side transfer unit, and the other fixed conveyor form a conveyance path on which horizontal circulation conveyance of the storage target object is performed.

3. The automated warehouse unit according to claim 1, wherein
   the two rows of the fixed conveyors are arranged on upper and lower sides, and
   conveyance paths of the receiving-side transfer unit, the one fixed conveyor, the shipping-side transfer unit, and the other fixed conveyor form a conveyance path on which vertical circulation conveyance of the storage target object is performed.

4. The automated warehouse unit according to claim 1, wherein
   the first transportation conveyor includes a second stopping device configured to contact the storage target object so as to stop conveying of the storage target object,
   the second stopping device defines a storage position for one storage target object on the first transportation conveyor.

5. The automated warehouse unit according to claim 1, wherein
   the first transportation conveyor includes two second stopping devices separated from each other in the first direction and configured to contact the storage target object so as to stop conveying of the storage target object,
   the two second stopping devices define a storage position for one storage target object on the first transportation conveyor.

6. The automated warehouse unit according to claim 1, wherein
   an operation of the receiving-side transfer unit includes transferring the storage target object to the one fixed conveyer and transferring the storage target object from the one fixed conveyer to the other fixed conveyer, and
   an operation of the shipping-side transfer unit includes receiving the storage target object from the one fixed conveyer and transferring the storage target object from the one fixed conveyer to the other fixed conveyer.

7. An automated warehouse equipment including
   a plurality of automated warehouse units extending in a first direction and arrayed in a horizontal direction,
   a receiving-side transfer device extending in an array direction of the plurality of automated warehouse units and provided on one side of the plurality of automated warehouse units in the first direction, and
   a shipping-side transfer device extending in the array direction of the plurality of automated warehouse units and provided on the other side of the plurality of automated warehouse units in the first direction,
   wherein
   each of the plurality of automated warehouse units includes
   two rows of fixed conveyors, on which a storage target object is placed, configured to convey the storage target object in the first direction,
   a receiving-side transfer unit provided on one end portion side of the two rows of the fixed conveyors and extending in a second direction orthogonal to the first direction, and
   a shipping-side transfer unit provided on the other end portion side of the two rows of the fixed conveyors and extending in the second direction,
   each of the receiving-side transfer unit and the shipping-side transfer unit includes
   a first moving device configured to reciprocally move a first moving body in the second direction between a position facing one fixed conveyor in the two rows of the fixed conveyors and a position facing the other fixed conveyor in the two rows of the fixed conveyors, and a first transportation conveyor supported by the first moving body and configured to transfer the storage target object to the two rows of the fixed conveyors in the first direction, the receiving-side transfer device is arranged adjacently to be parallel to each of the receiving-side transfer units of the plurality of automated warehouse units, the shipping-side transfer device is arranged adjacently to be parallel to each of the shipping-side transfer units of the plurality of automated warehouse units, the receiving-side transfer device includes a second moving device configured to reciprocally move a second moving body in the second direction to positions respectively facing the receiving-side transfer units of the plurality of automated warehouse units, and a second transportation conveyor supported by the second moving body and configured to convey the storage target object to each of the receiving-side transfer units in the first direction, and the shipping-side transfer device includes a third moving device configured to reciprocally move a third moving body in the second direction to positions respectively facing the shipping-side transfer units of the plurality of automated warehouse units, and a third transportation conveyor supported by the third moving body and configured to convey the storage target object from each of the shipping-side transfer units in the first direction.

8. The automated warehouse equipment according to claim 7, wherein a plurality of receiving-side transfer devices are connected in the array direction and provided, a plurality of shipping-side transfer devices are connected in the array direction and provided, and the automated warehouse equipment further includes a receiving-side relay transfer device configured to transfer the storage target object between the adjacent receiving-side transfer devices, and a shipping-side relay transfer device configured to transfer the storage target object between the adjacent shipping-side transfer devices.

9. The automated warehouse equipment according to claim 7, further comprising:

at least one loading device configured to load the storage target object into the receiving-side transfer device; and at least one unloading device configured to unload the storage target object from the shipping-side transfer device.

10. An automated warehouse equipment including at least one automated warehouse unit extending in a first direction, at least one first fixed conveyor extending in the first direction and arranged side by side with the at least one automated warehouse unit, a receiving-side transfer device extending in an array direction of the at least one automated warehouse unit and the first fixed conveyor and provided on one side of the at least one automated warehouse unit and the first fixed conveyor in the first direction, and a shipping-side transfer device extending in the array direction and provided on the other side of the at least one automated warehouse unit and the first fixed conveyor in the first direction, wherein each of the at least one automated warehouse unit includes two rows of fixed conveyors, on which a storage target object is placed, configured to convey the storage target object in the first direction, a receiving-side transfer unit provided on one end portion side of the two rows of the fixed conveyors and extending in a second direction orthogonal to the first direction, and a shipping-side transfer unit provided on the other end portion side of the two rows of the fixed conveyors and extending in the second direction, each of the receiving-side transfer unit and the shipping-side transfer unit includes a first moving device configured to reciprocally move a first moving body in the second direction between a position facing one fixed conveyor in the two rows of the fixed conveyors and a position facing the other fixed conveyor in the two rows of the fixed conveyors, and a first transportation conveyor supported by the first moving body and configured to transfer the storage target object to the two rows of the fixed conveyors in the first direction, the receiving-side transfer device is arranged adjacently to be parallel to one end portion side of the at least one first fixed conveyor and the receiving-side transfer unit of the at least one automated warehouse unit, the shipping-side transfer device is arranged adjacently to be parallel to the other end portion side of the at least one first fixed conveyor and the shipping-side transfer unit of the at least one automated warehouse unit, the receiving-side transfer device includes a second moving device configured to reciprocally move a second first moving body in the second direction to positions respectively facing the at least one first fixed conveyor and the receiving-side transfer unit of the at least one automated warehouse unit, and a second transportation conveyor supported by the second moving body and configured to transfer the storage target object to the receiving-side transfer unit in the first direction, and the shipping-side transfer device includes a third moving device configured to reciprocally move a third moving body in the second direction to positions respectively facing one end portion side of the at least one first fixed conveyor and the shipping-side transfer unit of the at least one automated warehouse unit, and a third transportation conveyor supported by the third moving body and configured to transfer the storage target object from the shipping-side transfer unit in the first direction.

11. The automated warehouse equipment according to claim 10, wherein a plurality of receiving-side transfer devices are connected in the array direction and provided, a plurality of shipping-side transfer devices are connected in the array direction and provided, and the automated warehouse equipment further includes a receiving-side relay transfer device configured to transfer the storage target object between the adjacent receiving-side transfer devices, and a shipping-side relay transfer device configured to transfer the storage target object between the adjacent shipping-side transfer devices.

12. The automated warehouse equipment according to claim 10,
further comprising:
at least one loading device configured to load the storage target object into the receiving-side transfer device; and
at least one unloading device configured to unload the storage target object from the shipping-side transfer device.

* * * * *